(12) United States Patent
Hossain et al.

(10) Patent No.: US 11,697,779 B2
(45) Date of Patent: Jul. 11, 2023

(54) CO-GASIFICATION OF MICROALGAE BIOMASS AND LOW-RANK COAL TO PRODUCE SYNGAS/HYDROGEN

(71) Applicant: King Fahd University of Petroleum and Minerals, Dhahran (SA)

(72) Inventors: Mohammad Mozahar Hossain, Dhahran (SA); Muflih Arisa Adnan, Dhahran (SA)

(73) Assignees: King Fahd University of Petroleum and Minerals, Dhahran (SA); King Abdulaziz City for Science and Technology, Riyadh (SA)

( * ) Notice: Subject to any disclaimer, the term of this patent is extended or adjusted under 35 U.S.C. 154(b) by 1061 days.

(21) Appl. No.: 16/362,127

(22) Filed: Mar. 22, 2019

(65) Prior Publication Data

US 2020/0299595 A1  Sep. 24, 2020

(51) Int. Cl.
  *C10K 1/00* (2006.01)
  *C10K 1/32* (2006.01)
  *C01B 3/34* (2006.01)
  *C01B 3/50* (2006.01)
  *C01B 3/56* (2006.01)
  (Continued)

(52) U.S. Cl.
  CPC .............. *C10K 1/005* (2013.01); *B01D 53/02* (2013.01); *B01D 53/229* (2013.01); *C01B 3/34* (2013.01); *C01B 3/503* (2013.01); *C01B 3/56* (2013.01); *C10J 3/84* (2013.01); *C10K 1/32* (2013.01); *B01D 2256/16* (2013.01); *B01D 2256/20* (2013.01); *B01D 2257/504* (2013.01); *C01B 2203/0205* (2013.01); *C01B 2203/042* (2013.01); *C01B 2203/0405* (2013.01); *C01B 2203/0475* (2013.01); *C10J 2300/093* (2013.01); *C10J 2300/0916* (2013.01); *C10J 2300/1612* (2013.01); *C10J 2300/1618* (2013.01); *C10J 2300/1625* (2013.01)

(58) Field of Classification Search
  CPC .......... C10K 1/005; B01D 53/02; C01B 3/34; C01B 3/56; C01J 3/84
  USPC ...................................................... 252/373
  See application file for complete search history.

(56) References Cited

U.S. PATENT DOCUMENTS

| 5,741,440 | A | * | 4/1998 | Cooper | ...................... C10J 3/00 252/373 |
| 2010/0158792 | A1 | * | 6/2010 | Drnevich | ................ C10K 3/04 252/373 |

(Continued)

FOREIGN PATENT DOCUMENTS

| CN | 103992823 B | 8/2016 |
| WO | 2009/091325 A1 | 7/2009 |

OTHER PUBLICATIONS

Synergistic effects from co-pyrolysis of low-rank coal and model components of microalgae biomass. Zhiqiang Wu et al. Energy conversion and management, V 135, pp. 212-225 (Year: 2017).*

(Continued)

*Primary Examiner* — Douglas B Call
(74) *Attorney, Agent, or Firm* — Oblon, McClelland, Maier & Neustadt, L.L.P.

(57) ABSTRACT

A process and apparatus for producing syngas from low grade coal and from a biomass wherein the process includes (i) gasification of a mixture of low grade coal and biomass, (ii) reforming the gasified mixture, and (iii) removing $CO_2$ from the gasified and reformed syngas mixture.

15 Claims, 23 Drawing Sheets

(51) Int. Cl.
*B01D 53/22* (2006.01)
*B01D 53/02* (2006.01)
*C10J 3/84* (2006.01)

(56) References Cited

U.S. PATENT DOCUMENTS

| | | | | |
|---|---|---|---|---|
| 2010/0224835 | A1* | 9/2010 | Chornet | C10K 1/004 252/373 |
| 2010/0285576 | A1 | 11/2010 | Norbeck et al. | |
| 2011/0142721 | A1* | 6/2011 | Murakami | C10G 2/30 422/139 |
| 2011/0201699 | A1* | 8/2011 | Lucas | C10K 1/101 422/105 |
| 2011/0308155 | A1* | 12/2011 | Paskach | C10J 3/485 48/77 |
| 2012/0010304 | A1* | 1/2012 | Tasaka | C10G 65/04 518/700 |
| 2012/0011856 | A1* | 1/2012 | Wright | C01B 3/56 60/780 |
| 2013/0109765 | A1* | 5/2013 | Jiang | C10G 2/00 252/373 |
| 2013/0144087 | A1* | 6/2013 | Arora | C07C 29/1518 252/373 |
| 2013/0214207 | A1* | 8/2013 | Gharda | C10B 49/10 201/4 |
| 2013/0331623 | A1* | 12/2013 | Elliott | C10B 49/16 44/307 |
| 2014/0048744 | A1* | 2/2014 | Avagliano | C10K 1/04 252/372 |
| 2014/0091260 | A1* | 4/2014 | Narukawa | C10J 3/723 252/373 |
| 2017/0001863 | A1* | 1/2017 | Park | B01J 37/031 |
| 2017/0015602 | A1 | 1/2017 | Fiato et al. | |
| 2017/0362520 | A1* | 12/2017 | Vreugdenhil | C10J 3/485 |

OTHER PUBLICATIONS

Co-pyrolysis behavior of microalgae biomass and low-rank coal: Kinetic analysis of the main volatile products. Zhiqiang Wu et al. Bioresource Technology, V 271, pp. 202-209 (Year: 2019).*

Adnan, et al.; Gasification performance of various microalgae biomass—A thermodynamic study by considering tar formation using Aspen plus; Energy Conversion and Management 165; pp. 783-793; Mar. 19, 2018; 11 Pages.

Zaini, et al.; Algae Conversion to Hydrogen and Power by Integration of Drying, Gasification, and Chemical Looping Combustion 25th European Biomass Conference and Exhibition; Jun. 2017; pp. 794-798; 6 Pages.

Azadi, et al.; Production of Biorenewable Hydrogen and Syngas via Algae Gasification: A Sensitivity Analysis; Energy Procedia 61; pp. 2767-2770; 2014; 5 Pages.

Adnan, et al.; Co-gasification of Indonesian coal and mircoalgae—A thermodynamic study and performance evaluation; Chemical Engineering & Processing: Process Intensification 128; pp. 1-9; Apr. 1, 2018; 9 Pages.

* cited by examiner

CO-GASIFICATION OF MICROALGAE BIOMASS AND LOW-RANK COAL TO PRODUCE SYNGAS/HYDROGEN

STATEMENT REGARDING PRIOR DISCLOSURES BY THE INVENTOR OR A JOINT INVENTOR

Adnan, M. A., Hossain, M. M. (2018), *Co-gasification of Indonesian coal and microalgae A thermodynamic study and performance evaluation*, Chemical Engineering and Processing—Process Intensification, 128 (2018), Pages 1-9 (Accepted 1 Apr. 2018, Available online 3 Apr. 2018.) which is incorporated by reference for all purposes.

BACKGROUND OF THE INVENTION

Field of the Invention

The invention pertains to the field of chemical engineering, more specifically to gasification of low grade coal and algae biomass to produce syngas.

Description of Related Art

The increase of fossil fuel combustion associated with the growth of industrial activities contributes to huge amounts of $CO_2$ release into the surroundings. The excess quantity of $CO_2$ emission is thought to contribute to severe environmental problems such as climate change and global warming. See de Lasa H, Salaices E, Mazumder J, Lucky R. Catalytic Steam Gasification of Biomass: Catalysts, Thermodynamics and Kinetics. Chem Rev 2011; 111:5404, incorporated herein by reference in its entirety. The climate anomalies threaten the sustainability of the human being and other ecosystems.

In order to limit the harmful effects of fossil fuel combustion while maintaining the industrial and economic growths, communities have been working on development of renewable energy resources and advanced energy conversion technologies. Biomass from different sources including both terrestrial and aquatic plants has been considered as a sustainable renewable energy source due to their abundant availability with a minimum cost. See Sansaniwal S K, Rosen M A, Tyagi S K. Global challenges in the sustainable development of biomass gasification: An overview. Renew Sust Energ Rev 2017; 80:23, incorporated herein by reference in its entirety. Recently, some aquatic biomasses, particularly micro- and macro-algae, have received growing interest because of their high productivity, easy cultivation, and ability to recycle $CO_2$ by photosynthetic processes. The combustion of these aquatic biomasses also emits minimum amounts of $SO_x$, as their sulfur content is lower than that found in fossil fuels. See Razzak S A, Hossain M M, Lucky R A, Bassi A S, de Lasa H. Integrated $CO2$ capture, wastewater treatment and biofuel production by microalgae culturing—A review. Renew Sust Energ Rev 2013; 27:622; and Razzak S A, Ali SAM, Hossain M M, deLasa H. Biological $CO_2$ fixation with production of microalgae in wastewater—A review. Renew Sust Energ Rev 2017; 76:379, each incorporated herein by reference in their entirety.

For several years, research has been focused on microalgae to biodiesel production technologies by extracting the lipid from the microalgae cells. See Chisti Y. Biodiesel from microalgae. Biotechnology Advances 2007; 25:294, incorporated herein by reference in its entirety. Recently, thermochemical processes including gasification and combustion are gaining more attention due to their high conversion efficiency. See Adnan M A, Susanto H, Binous H, Muraza O, Hossain M M. Feed compositions and gasification potential of several biomasses including a microalgae: A thermodynamic modeling approach. Int J Hydrogen Energy 2017; 42:17009; Adnan M A, Hossain M M. Gasification of various biomasses including microalgae using $CO_2$—A thermodynamic study. Renew Energ 2018; 119:598; and Qadi N M N, Hidayat A, Takahashi F, Yoshikawa K. Co-gasification kinetics of coal char and algae char under CO2 atmosphere. Biofuels 2017; 8:281, each incorporated herein by reference in their entirety. The produced gas (usually referred to as syngas) can be used in various applications including fuel gas, power generation, and feedstock for other chemical industries such as methanol, fertilizer, etc.

On the other hand, coal plays a significant role meeting the global energy demand. Around 40% of global electricity demand is currently being met by coal combustion. See Khatami R, Levendis Y A. An overview of coal rank influence on ignition and combustion phenomena at the particle level. Combustion and Flame 2016; 164:22, incorporated herein by reference in its entirety.

Coals are classified into various ranks according to their combustion quality. With ever increasing energy demand, the focus is shifting to low-rank coal despite limitations which include low heating value, high moisture content and high $CO_2$ emissions.

In addition, in some countries including Indonesia and China, low-rank (lignite and sub-bituminous coal) coal is abundantly available as compared to the high-rank coal. See Tahmasebi A, Zheng H, Yu J. The influences of moisture on particle ignition behavior of Chinese and Indonesian lignite coals in hot air flow. Fuel Process Technol 2016; 153:149, incorporated herein by reference in its entirety.

For combustion in a pulverized coal combustor, low-rank coal requires additional treatment to deal with excessive moisture content. In some applications, high-temperature exhaust gas is used in thermal drying for removing moisture from low-rank coal. However, these additional treatments undermine the overall efficiency of the power plant. See Xu C, Xu G, Zhao S, Zhou L, Yang Y, Zhang D. An improved configuration of lignite pre-drying using a supplementary steam cycle in a lignite fired supercritical power plant. Appl Energ 2015; 160:882, incorporated herein by reference in its entirety.

In this regard, the gasification followed by combustion of the gasified products is considered as an efficient and environmental friendly approach for utilization of low-rank coal. See Zhang L, Kajitani S, Umemoto S, Wang S, Quyn D, Song Y, et al. Changes in nascent char structure during the gasification of low-rank coals in $CO_2$. Fuel 2015; 158:711, incorporated herein by reference in its entirety. However, presence of moisture in other low-rank coal gasification mixtures can facilitate rather than diminish the gasification process.

In view of the problems associated with gasification of low rank coal, many studies have been directed to investigate and identify suitable parameters to enhance the gasification performance of low-rank coal into usable energy; Duan W, Yu Q, Liu J, Wu T, Yang F, Qin Q. Experimental and kinetic study of steam gasification of low-rank coal in molten blast furnace slag. Energy 2016; 111:859; Xiao Y, Xu S, Song Y, Wang C, Ouyang S. Gasification of low-rank coal for hydrogen-rich gas production in a dual loop gasification system. Fuel Process Technol 2018; 171:110; and Fan S, Xu L-H, Kang T-J, Kim H-T. Application of eggshell as catalyst for low rank coal gasification: Experimental and kinetic studies. Journal of the Energy Institute 2017; 90:696, each incorporated herein by reference in their entirety.

Recently, the use of $CO_2$ in biomass/coal gasification is gaining increasing interest due to the opportunity utilization of this greenhouse gas in the gasification process. See Adnan et al. (2018); Soreanu G, Tomaszewicz M, Fernandez-Lopez M, Valverde J L, Zuwala J, Sanchez-Silva L. CO2 gasification process performance for energetic valorization of microalgae. Energy 2017; 119:37; and Billaud J, Valin S, Peyrot M, Salvador S. Influence of $H_2O$, $CO_2$ and $O_2$ addition on biomass gasification in entrained flow reactor conditions: Experiments and modelling. Fuel 2016; 166: 166, each incorporated herein by reference in their entirety.

The use of a catalyst is another interesting aspect of gasification of biomass/coal. Garcia et al. studied catalytic performance of $Ni/Al_2O_3$ on $CO_2$ gasification of pine sawdust. See Garcia L, Salvador M L, Arauzo J, Bilbao R. $CO_2$ as a gasifying agent for gas production from pine sawdust at low temperatures using a Ni/Al coprecipitated catalyst. Fuel Process Technol 2001; 69:157, incorporated herein by reference in its entirety. The experimental results indicated that the presence of $Ni/Al_2O_3$ enhances CO and $H_2$ concentrations in the produced gas. Billaud reported that $CO_2$ and $H_2O$ have a significant influence on the char conversion. However, at atmospheric condition $CO_2$ has minimum effects on the gasification process.

Although the experimental works are important to understand the required reaction conditions of gasification process, they are time-consuming and expensive in terms of investment cost and consumable materials. See Masmoudi M A, Halouani K, Sahraoui M. Comprehensive experimental investigation and numerical modeling of the combined partial oxidation-gasification zone in a pilot downdraft air-blown gasifier. Energy Conyers Manage 2017; 144:34, incorporated herein by reference in its entirety.

In this regard, thermodynamic equilibrium model analysis is faster and economically more attractive than the experimental investigation for studying gasification process. See Adnan et al., A thermodynamic modeling approach, Int J Hydrogen Energy 2017 (2017); Adnan et al. (2018); Fortunato B, Brunetti G, Camporeale S M, Torresi M, Fornarelli F. Thermodynamic model of a downdraft gasifier. Energy Conyers Manage 2017; 140:281; and Han J, Liang Y, Hu J, Qin L, Street J, Lu Y, et al. Modeling downdraft biomass gasification process by restricting chemical reaction equilibrium with Aspen Plus. Energy Conyers Manage 2017; 153:641, each incorporated herein by reference in its entirety.

An appropriate thermodynamic simulation can be useful to achieve the optimum experimental operating conditions with high accuracy. For example, the inventors developed a thermodynamic model to find the conditions of a modified moving bed downdraft gasifier. Adnan et al., A thermodynamic study by including tar, Int. J. Hydrogen Energy (2017). Renganathan et al. used a thermodynamic model to study the gasification performance of carbonaceous feed stocks using $CO_2$, $O_2$ and steam as the gasifying agents. See Renganathan T, Yadav M V, Pushpavanam S, Voolapalli R K, Cho Y S. $CO_2$ utilization for gasification of carbonaceous feedstocks: A thermodynamic analysis. Chem Eng Sci 2012; 83:159, incorporated herein by reference in its entirety. Chaiwatanodom et al. conducted a thermodynamic model analysis to investigate the $CO_2$ gasification of biomass using a $CO_2$ recycle option. See Chaiwatanodom P, Vivanpatarakij S, Assabumrungrat S. Thermodynamic analysis of biomass gasification with $CO_2$ recycle for synthesis gas production. Appl Energ 2014; 114:10, incorporated herein by reference in its entirety. To the best of our knowledge, there is no detail thermodynamic modeling study reported in the open literature dealing with the integrated microalgae biomass and coal gasification.

In view of the numerous relevant variables and the complexity of selecting an appropriate combination of feedstocks and process conditions, the present inventors aimed at investigating the performance of an integrated co-gasification of microalgae and coal using an equilibrium model. In addition a thermodynamic model was developed using Aspen Plus. As feedstocks, *Nannochloropsis oculata* (*N. oculata*) microalgae biomass and Indonesian low-rank brown coal were used. The combined use of biomass and coal with $CO_2$ recycling option offers the opportunity of using abundantly available coal with minimum $CO_2$ emission.

The model permitted the inventors to determine which process parameters critically affect efficient production of syngas with a low content of $CO_2$ as well as the advantageous operating conditions of co-gasification.

BRIEF SUMMARY OF THE INVENTION

An efficient process for co-gasifying or gasifying low grade coal and biomass is provided. This process is based on an integrated co-gasification of coal and biomass simulation model. It includes three subprocesses: (i) gasification, (ii) reforming and (iii) $CO_2$ absorption. The process as modeled using the simulation exhibited a good accuracy when compared to experimental values obtained under the same operating conditions.

In co-gasification evaluation, a low-rank coal and *Nannochloropsis oculata* microalgae biomass were considered as feedstocks. The parametric study was carried out using various biomass to coal ratios at different pressures. The performance of the overall process was evaluated in terms of syngas composition, gasification system efficiency (GSE) and cold gas efficiency (CGE). The reforming and $CO_2$ absorption steps enabled the process providing high purity syngas.

The increase of biomass/coal ratio enhanced GSE while decreased CGE.

High pressure operation was found to be unfavorable for producing high quality syngas as the increase of pressure affected the gasification.

Overall, the co-gasification of biomass/coal is a promising approach to utilize low-value coal and biomass feedstocks to produce high value syngas and contributes to minimization of greenhouse gas emissions.

Embodiments of the invention include, but are not limited to the following.

A process for producing syngas that comprises, consists essentially or consists of: co-gasifying a feedstock comprising low rank coal and a microalgae biomass at a temperature of about 700, 750, 800 to 850° C. with a gasification agent comprising at least >21, 25, 30, 35, 40, 45, 50, 55, 60, 65, 70, 75, 80, 85, 90, 95 vol. % oxygen to produce gasified intermediates; reforming the gasified intermediates to produce syngas; and removing carbon dioxide from the syngas, thereby producing syngas comprising hydrogen and carbon monoxide. However, in some embodiments the co-gasification and/or reforming temperature may range from 500, 600, 700, 800, 900, 1,000, 1,100, 1,200 or >1,200° C. (or any intermediate value within this range).

In some embodiments, the mixed feedstock may be heated at a rate from about 10, 20, 30, 40, to about 50°

C./min and/or the co-gasification can be performed using a gasifier (e.g., $O_2$, $CO_2$ and/or $H_2O$) supplied at a flow rate ranging from about 50 to 300 mL/min.

In other embodiments, a steam to carbon ratio can vary from 0.0 to 2.0, for example, from 0.0, >0.0, 0.01, 0.02, 0.05, 0.1, 0.2, 0.5, 1, 1.2, 1.5, <2, to 2 or any intermediate value within this range.

Gasification may be conducted in a counter-cured fixed bed gasifier, a co-current fixed bed gasifier, a fluidized bed reactor, an entrained flow gasifier or a plasma gasifier or other suitable gasifier. Gasifiers are known in the art and are incorporated by reference to https://_en.wikipedia.org/wiki/Gasification (last accessed Mar. 7, 2019).

The temperature of the reformer unit is about 800° C., for example, from about 750, 775, 800, 825, to about 850° C.

Advantageously this method may be used with a low grade coal feedstock such as Indonesian coal, its compositional equivalents or other low grade coals as well as with aquatic biomass such as *Nannochloropsis oculata* microalgae biomass or compositional equivalents of this biomass. A problem of the gasification of algal biomass and low grade coal is the high $CO_2$ concentration in the syngas.

Among its other advantages, the invention includes a $CO_2$ absorber to remove $CO_2$ from the syngas stream. The product of $CO_2$ absorber is high-purity $CO_2$ and high quality syngas in term of syngas composition.

The process is advantageously practiced using a biomass/coal ("B/C") ratio ranging from about 0.75 to about 1, for example, 0.7, 0.75, 0.8, 0.85, 0.9, 0.95, <1 or 1.0.

The co-gasification step of this method can advantageously use oxygen as a co-gasifier, for example, air or a gasifier enriched in oxygen, such as one containing >21, 25, 30, 35, 40, 45, 50, 55, 60, 65, 70, 75, 80, 85, 90, 95 or >95 vol. % oxygen. Preferably, co-gasification occurs with lower than atmospheric concentration of nitrogen, for example <78 vol. % including no more than 1, 2, 5, 10, 20, 30, 40, 50, 60, 70, 75 or 78 vol. % nitrogen.

Co-gasification may also occur in the presence of oxygen, $H_2O$ or $CO_2$ or a mixture of two or three of these.

Co-gasification and reforming during the process as disclosed herein may occur at a pressure of 1, 2, 3, 4, 5, 10, 20, 30, 40 or 50 bar (or any intermediate value within this range). Preferably as explained herein, the pressure is about 1 bar.

In one embodiment of the process disclosed herein the $O_2$ equivalence ratio (ER) ranges from 0 to 0.4, the B/C ratio ranges from 0.75 to 1 and the co-gasification agent is at least 80 vol. % oxygen containing less than 5 vol. % nitrogen.

In another embodiment of the invention, the B/C ratio, pressure, S/C ratio, $CO_2$ to fixed carbon in the biomass ratio (" $CO_2$:C molar ratio"), and $O_2$ equivalence ratio (ER) are selected to provide a gasification system efficiency ("GSE") ranging from 0.8 to 0.99. Co-gasification may also be performed at 0.9 to 1.1 bar with a steam:carbon (S/C) ratio of 0.9 to 1.1, a $CO_2$:C molar ratio of 0.9, 0.95, 1.00, 1.05 to 1.1, and an equivalence ratio (ER) of 0.00 to 0.40. Advantageously, this embodiment may be performed where gasification is performed at about 1 bar with a steam:carbon (S/C) ratio of about 1, a $CO_2$:C molar ratio of about 1 and an $O_2$ equivalence ratio (ER) of about 0.00.

In another embodiment of this process, the B/C ratio, pressure, S/C ratio, $CO_2$:C ratio, and $O_2$ equivalence ratio (ER) are selected to provide a cold gas efficiency ("CGE") ranging from 0.3 to 0.5. Advantageously, a biomass/coal ratio of 0.00 at no more than 1-2 bar with an S/C ratio of 0.00 a carbon dioxide:carbon ratio of 0.9 to 1.1 and an $O_2$ equivalence ratio (ER) of 0.31 to 0.41 is used. Preferably, the biomass/coal ratio is about 0.00, at about 1 bar with an S/C ratio of about 0.00 a $CO_2$:C molar ratio of about 1 and an $O_2$ equivalence ratio (ER) of about 0.36.

In preferred embodiments, during or after co-gasification ash and unconverted char are removed from the co-gasified material.

The process as described herein also removes $CO_2$ from the reformed co-gasified product. This may be accomplished using methods and equipment known in the art include, but not limited to contacting the syngas using a membrane that separates $CO_2$ from syngas or by using a chemical adsorbent for $CO_2$. Preferably, a Ca-based $CO_2$ absorbent, such as one supplying exothermic heat, is not used to remove the carbon dioxide.

Another embodiment of the invention is directed to apparatus configured to perform the processes disclosed herein. The apparatus includes at least one input line for carbon dioxide (10), $H_2O$ (30), $O_2$ (60), and biomass and coal feed (80), a gasifier (GSR)(100), a cyclone (CYL)(200), a reformer (RFM)(300), $CO_2$ absorber (ABR)(400), an output line for carbon dioxide (440), and an output line for syngas (470); wherein the input lines input oxygen, $H_2O$, carbon dioxide and biomass and coal feed to the gasifier, the gasifier is connected to the cyclone which is connected to the reformer, which is connected to the $CO_2$ absorber which has an output line or port for syngas from which $CO_2$ has been removed.

This apparatus may also include $CO_2$ line feeds through a $CO_2$ compressor (CP-1)(20), the $H_2O$ line feeds water through a pump (PMP-1)(40) and boiler (BL1)(50), the $O_2$ line feeds through a compressor (CP-2)(70) and/or the biomass and coal-feed (80) feeds via a solid feeder system; and/or the absorber (ABR)(400) receives syngas from the reformer (RFM)(300) and feeds $CO_2$ to a cooler (CR-1) (410) and a compressor for the $CO_2$ product (CP-3)(420) which is linked to a second cooler (CR-2)(430) that provides an outward $CO_2$ feed (440); and the absorber (ABR)(400) receives syngas from the reformer (RFM)(300) and feeds non-$CO_2$ components of the syngas to a turbine (TR)(450) which feeds syngas to a third cooler (CR-3)(460). One embodiment of this apparatus is depicted by FIG. 1.

Another embodiment of the invention is directed to a method for producing syngas from Indonesian coal or an equivalent low grade coal and from *Nannochloropsis oculata* microalgae biomass or an equivalent biomass comprising feeding a mixture of the coal and the biomass and a gasifying agent comprising oxygen, $H_2O$ and/or $CO_2$ into the apparatus as disclosed herein gasifying the mixture, reforming the mixture, and removing $CO_2$ from the reformed mixture.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings below.

(FIG. 3A) 1 bar, (FIG. 3B) 25 bar and (FIG. 3C) 50 bar. (Red: CO, black: $H_2$ and blue: $CO_2$).

(FIG. 4A) 1 bar, (FIG. 4B) 25 bar and (FIG. 4C) 50 bar.

(FIG. 5A) 1 bar, (FIG. 5B) 25 bar and (FIG. 5C) 50 bar.

(FIG. 6A) 1 bar, (FIG. 6B) 25 bar and (FIG. 6C) 50 bar. (Red: CO, black: $H_2$ and blue: $CO_2$).

FIGS. 8A-8C. The effect of S/C ratio on GSE (black) and CGE (red) at different pressures.

DETAILED DESCRIPTION OF THE INVENTION

Process Description.

Figure 1:
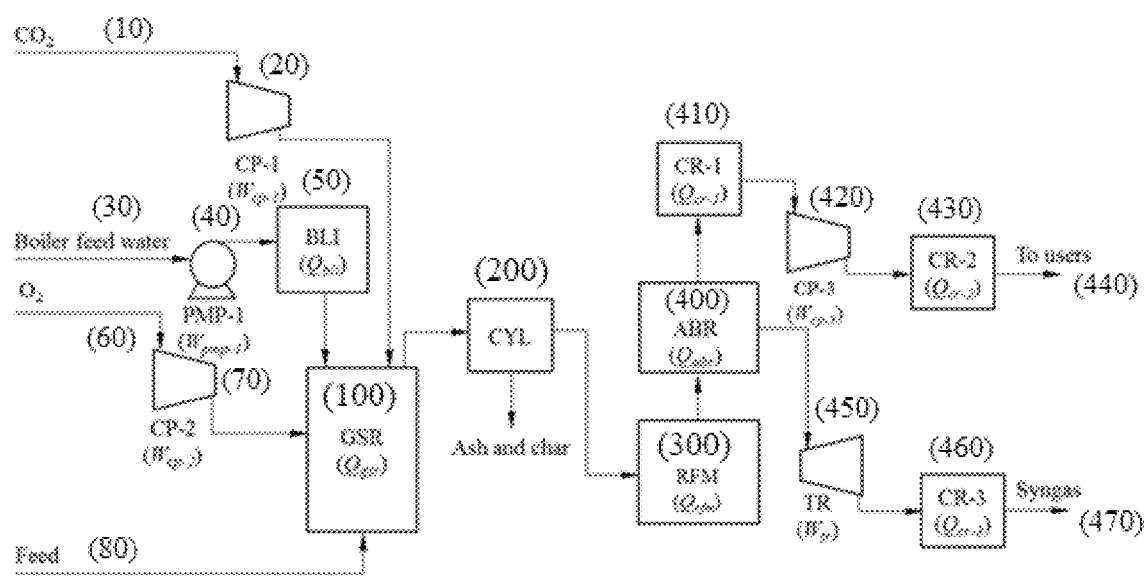
FIG. 1. Block diagram of the integrated co-gasification process.

FIG. 1 depicts a schematic block diagram of an integrated co-gasification system which includes three main processes: (i) gasification of coal/biomass, (ii) reforming of gasified intermediates and (iii) syngas treatment process including $CO_2$ absorber (ABR) and $CO_2$ compressor (CP-2).

Mixed feedstocks of N. oculata and Indonesian coal having different compositions were used and the composition or properties of these feedstocks are presented in Table 1.

The proximate composition of a feedstock biomass includes, but is not limited to, a moisture content ranging from 5, 6, 7, to 8 mass %, volatile matter content ranging from 60, 65, 70, 75, 80, 85, or 95 mass %, fixed carbon content ranging from 6, 6.5, 7, 7.5, 8, 8.5, 9, or 9.5 mass %, and an ash content ranging from 5, 5.5, 6, 6.5, 7, 7.5 to 8 mass %. The ultimate composition of a biomass feedstock includes, but is not limited to, a content of C (carbon) ranging from 35, 40, 45, 50, to 55 mass %; a content of H (hydrogen) ranging from 4, 5, 6, to 7 mass %, a content of O (oxygen) ranging from 35, 40, 45, 50, to 55 mass % and a HHV, MJ/kg ranging from 12, 13, 14, 15, 16, 17, 18 to 19. These ranges include all intermediate values and subranges.

Other types of biomass which are substantially equivalent in composition to N. oculata biomass, such as a biomass having not more than about 1, 2, 5, 10, 15, or 20% difference in any of the values described in Table 1 for N. oculata biomass may also be employed. For example, biomass obtained from other species of Nanochloropsis such as N. gaditana, N. granulate, N. limnetica, N. oceanica, N. oculata or N. salina, may be used in some embodiments.

The proximate composition of a feedstock coal includes, but is not limited to, a moisture content ranging from 8, 9, 10, 11, 12, 13 or 14 mass %, a volatile matter content ranging from 30, 35, 40, 45, 50 to 55 mass %, a fixed carbon content ranging from 30, 35, 40, 45, to 50 mass %, and an ash content ranging from 6, 6.5, 7, 7.5, 8, 8.5, 9 to 9.5 mass %. The ultimate composition of a coal feedstock includes, but is not limited to, a C (carbon) content ranging from 55, 60, 65, 70, 75, 80, to 85 mass %; a content of H (hydrogen) ranging from 4, 4.5, 5, 5.5, 6, to 6.5 mass %, a content of O (oxygen) ranging from 15, 20, 25, to 30 mass % a N (nitrogen) content ranging from 0, to >0, to 0.1, 0.2, 0.3, 0.5 to 0.6 mass % and S (sulfur) content ranging from 0, >0, 0.2, 0.5, 1, 2, 3, 4 or 5 mass % and a HHV, MJ/kg ranging from 18, 19, 20, 21, 22, 23, 24, 25, 26, 27, 28 to 29. These ranges include all intermediate values and subranges. Other types of coal which are substantially equivalent in composition to Indonesian coal, such as a coal not more than about 1, 2, 5, 10, 15 or 20% difference in one or more values described in Table 1 for Indonesian coal may also be employed. In some embodiments other types of coal, such as anthracite, bituminous, subbitumous, or lignite coals may be used in combination with N. oculata biomass.

Low rank coal may have a moisture content ranging from about 11.1, 12, 15, 20, to 22.33 wt %, volatile matter content ranging from about 38.05, 39, 40, 41, 42, 43 to about 43.46 wt %, fixed carbon ranging from about 37.47, 38, 39, 40, 41, to 42.08 wt % and ash content ranging from about 0.9, 1, 2, 3, 4, 5, 6, 7, to 7.8 wt %. Low rank coal may having a higher heating value (HHV) ranging from about 5038, 5050, 5100, 5150, 5200, 5300, 5400, 5500 to 5613 kcal/kg. These ranges include all intermediate values and subranges.

TABLE 1

Properties of the feed stocks.

| | N. oculata | Indonesian coal |
|---|---|---|
| Proximate, % mass | | |
| Moisture | 6.7 | 11.1 |
| Volatile matters | 78.9 | 42.4 |
| Fixed carbon | 8.0 | 38.7 |
| Ash | 6.4 | 7.8 |
| Ultimate, % mass | | |
| C | 44.5 | 69.1 |
| H | 5.8 | 5.1 |
| O | 43.3 | 22.5 |
| N | 0 | 0.2 |
| S | 0 | 3.1 |
| Ash | 0 | 0 |
| HHV, MJ/kg | 15.1 | 23.5 |

The low rank coal is a fossil fuel. The direct utilization of low rank coal (i.e, by combustion) leads to $CO_2$ emission to the environment. However, low rank coal has relatively higher value of calories as compared to microalgae biomass. The gasification and reforming process favors high temperature. Therefore, a combination of both can provide superior performance in term of syngas composition and the amount of $CO_2$ emission. For example, syngas produced according to the invention may have a content of $H_2$ ranging from about 20, 25, 30, to about 35 vol. % $H_2$, about 50, 55, 60, 65 to about 70 vol. % CO, 0.0, >0.0, 0.1, 0.2, 0.3, 0.4, or >0.4 vol. % $CH_4$, and 0. >0, 1, 2, 3, 4, 5, 6, 7, 8, 9, 10, 15, 20, 25, 30, 35, 40, to about 45 vol. % $CO_2$ or any intermediate value or subrange within these ranges. The simulation was based on $CO_2$ composition ranges between 0.00 to 0.45 vol.

This favorably compares to prior art methods which produce substantially more $CO_2$ such as those of Alghurabie et. al. (2013) Fluidized bed gasification of Kingston coal and marine microalgae in a spouted bed reactor, Chemical Engineering Research and Design, reported $CO_2$=51-63%, CO=26-43%, $CH_4$=3-6%, $H_2$=12-21%; and Kaewpanha et. al. (2014) Steam co-gasification of brown seaweed and land-based biomass, Fuel Processing Technology, reported $CO_2$=6-16%, CO=8-18%, $CH_4$=1-2%, $H_2$=10-27%.

In some embodiments, the composition of $H_2$, $CO_2$ and CO after passage through the $CO_2$ removal unit can range from 0.00 to 0.28, 0.21 to 0.56, and 0.00 to 0.45 by volume, respectively.

As shown by the block diagram in FIG. 1 this process involves a number of steps which are described below.

A mixed feed stock is fed to the gasifier (GSR) through a solid feeder system which can handle solid feed at high-pressure conditions; see. Adnan et al. (2018) which is incorporated herein by reference.

The steam is obtained by feeding boiler feed water (BFW) into the boiler (BLI) using a BFW pump (PMP-1).

The boiler (BLI) produces steam at desired pressure which is sent to the gasifier (GSR).

The other gasifying agents, including $CO_2$ and $O_2$, are supplied to the gasifier (GSR) from a $CO_2$ compressor (CP-1) and an $O_2$ compressor (CP-2), respectively.

In the gasifier (GSR) the feedstocks interact with the gasifying agents—steam, $O_2$ and $CO_2$—to produce both gaseous and solid product, as described by following set of chemical reactions:

$$\text{Partial oxidation } C+\tfrac{1}{2}O_2 \leftrightarrow CO \quad \Delta H_{298}^0 = -111 \text{ MJ/kmol} \tag{1}$$

$$\text{Boudouard reaction } C+CO_2 \leftrightarrow 2CO \quad \Delta H_{298}^0 = +172 \text{ MJ/kmol} \tag{2}$$

$$\text{Steam reforming } C+H_2O \leftrightarrow CO+H_2 \quad \Delta H_{298}^0 = \pm 131 \text{ MJ/kmol} \tag{3}$$

$$\text{Methane formation } C+2H_2 \leftrightarrow CH_4 \quad \Delta H_{298}^0 = -74 \text{ MJ/kmol} \tag{4}$$

$$\text{Hydrogen combustion } H_2+\tfrac{1}{2}O_2 \leftrightarrow H_2O \quad \Delta H_{298}^0 = -484 \text{ MJ/kmol} \tag{5}$$

$$\text{CO combustion } CO+\tfrac{1}{2}O_2 \leftrightarrow CO_2 \quad \Delta H_{298}^0 = -284 \text{ MJ/kmol} \tag{6}$$

$$\text{Water-gas shift reaction } CO+H_2O \leftrightarrow CO_2+H_2 \quad \Delta H_{298}^0 = -42 \text{ MJ/kmol} \tag{7}$$

$$\text{Methane-steam reforming } CH_4+H_2O \leftrightarrow CO+3H_2 \quad \Delta H_{298}^0 = +206 \text{ MJ/kmol} \tag{8}$$

$$\text{Methane-}CO_2 \text{ reforming } CH_4+CO_2 \leftrightarrow 2CO+2H_2 \quad \Delta H_{298}^0 = +247 \text{ MJ/kmol} \tag{9}$$

Further description of these chemical reactions and associated equipment is incorporated by reference to Adnan et al., Enhancement of hydrogen production in a modified moving bed downdraft gasifier—A thermodynamic study by including tar. Int J Hydrogen Energy (2017).

The gasified products are sent to the cyclone (CYL) to remove solids including ash and unconverted char from the gaseous products.

After separation, the gas stream is then directed to the reformer (RFM) and the solid products are disposed out of the system.

In the reformer (RFM), CO and $H_2$ concentrations in the gaseous products are further enhanced by both methane-steam reforming (Eq. 8) and methane-$CO_2$ reforming (Eq. 9) reactions.

The CO/$H_2$ enriched gaseous product is then directed to the $CO_2$-absorber (ABR) to reduce the $CO_2$ concentration.

The separated $CO_2$ from the $CO_2$-absorber (ABR) is passed through a series of unit operations, including cooler (CR-1) and $CO_2$-compressor (CP-2) to reduce its temperature and compress to the desired levels.

The high quality gaseous products—mainly $H_2$ and CO—from the $CO_2$-absorber (ABR) are expanded and cooled to atmospheric conditions using a gas turbine (TR) and by a syngas cooler (CR-3).

Specific process conditions include those described in the Examples as well as the following. Initially, feedstocks, boiler feed water, $CO_2$ and $O_2$ may be at ambient or room temperature, advantageously between 15, 20, 25, 30, 35, 40, 45 and 50° C. and preferably about 25° C. Steam temperature may range from 100, 150, 200, 250, 300, 350, 400 or >400° C., advantageously about 300 to 400° C. and preferably about 350° C. Gasifier temperature can range from 500, 550, 600, 650, 700, 750, 800, 850, 900, 1,000, 1,050, to 1,100° C., advantageously from about 650 to 900° C. and preferably from about 700 to 850° C. Reformer temperature can range from 600, 650, 700, 750, 800, 850, 900, 1,000, 1,050, 1,100, 1,050, to 1,200° C., advantageously from about 700 to 900° C. and preferably from about 750 to 850° C. Pressure in the gasifier and/or reformer can range from <1, 1, 2, 5, 10, 20, 30, 40, 50 or >50 bar, advantageously from about 1 to 5 bar, and preferably about 1 bar. Pump, compressor and turbine efficiencies may be selected by those skilled in the art are generally at least 60, 65, 70, 75, 80, 85, 90, 95 or >95% efficient. All intermediate values and subranges are included in the ranges above.

Model Development.

The integrated biomass and coal gasification simulation model was developed in Aspen Plus based on Gibbs free energy minimization approach. The minimization of Gibbs free energy is a well-known technique for performance analysis of gasification process; see Adnan et al., Feed compositions and gasification potential of several biomasses including a microalgae: A thermodynamic modeling approach. Int J Hydrogen Energy 2017; Renganathan et al. (2012), incorporated by reference.

The feedstock of the gasification is considered as the non-conventional element in this model. The gasifying agents including steam, $CO_2$ and $O_2$ are considered as the conventional elements. The gasification product consists of three type of element in the Aspen Plus, including conventional element (the gaseous product), non-conventional element (the ash) and ci-solid element (the unconverted char). The present simulation considered the Peng-Robinson equation of state (EoS) as it provides good accuracy for simulation of gasification; see Adnan et al., Feed compositions and gasification potential of several biomasses including a microalgae: A thermodynamic modeling approach. Int J Hydrogen Energy 2017; Adnan et al., Enhancement of hydrogen production in a modified moving bed downdraft gasifier—A thermodynamic study by including tar. Int J Hydrogen Energy (2017). On a clean power generation system with the co-gasification of biomass and coal in a quadruple fluidized bed gasifier. Bioresource Technology 2017; 235:113, are each incorporated herein by reference in their entirety.

EXAMPLES

A 100 kg/h of feed stock was used in all simulation runs. Both the gasifier (GSR) and reformer (RFM) are maintained at constant temperatures in order to minimize the kinetic limitation; see. Renganathan et al. (2012) incorporated by reference.

The gasification process is simulated using two blocks including RYield and RGibbs. The RYield represents the pyrolysis process, converting the feedstock (non-conventional element) into the conventional elements ($H_2$, CO, $CO_2$, $CH_4$, $H_2O$ $O_2$, and $N_2$,) and ci-solid element (char).

An external FORTRAN subroutine is embedded to Aspen Plus to describe the reactions in the RYield. The RGibbs facilitates the gasification reactions as described herein.

The cyclone in front of gasifier is defined using SSplit block, to remove the solids (ash and unconverted char) from the syngas.

The reformer unit, represent by the REquil block, enhances the $H_2$ and CO concentrations by facilitating methane-steam reforming (Eq. 8) and the methane-$CO_2$ reforming (Eq. 9) reactions.

The quality of the syngas is further upgraded by reducing the $CO_2$-concentration in the $CO_2$-absorber with 90% $CO_2$ removal. The calculation of the $CO_2$-absorber is developed by using an external Microsoft Excel subroutine.

The high-purity $CO_2$ is sent to the cooler/compressor block to compress it to 80 bar. The compressed high-purity $CO_2$ is then heated to 250° C. using a heater.

The high quality syngas is expanded using a turbine block into the atmospheric pressure.

The present simulation also contemplates including: (i) $N_2$ and ash which are considered as the inert materials, (ii) char which consists of pure carbon, (iii) a minimum mass transfer limitation and (iv) an insignificant pressure drop through the process.

The detailed parameters for the simulation model are tabulated in Table 2

TABLE 2

Operating conditions in the simulation.

| | |
|---|---|
| Initial temperature of feed stocks, boiler feed water, $CO_2$ and $O_2$ | 25° C. |
| Temperature of steam | 350° C. |
| Temperature of gasifier (GSR) | 700° C. |
| Temperature of reformer (RFM) | 800° C. |
| Pressure | 1-50 bar |
| Pump efficiency | 0.80 |
| $O_2$ and $CO_2$ compressor | |
| Isentropic efficiency | 0.85 |
| Mechanical efficiency | 0.96 |
| Gas turbine | |
| Isentropic efficiency | 0.93 |
| Mechanical efficiency | 0.99 |

Performance Evaluation.

The performance of the integrated co-gasification system is determined based on the (i) concentration of the desired components (CO and $H_2$), (ii) gasification system efficiency (GSE), and (iii) cold gas efficiency (CGE).

For performance assessment, the dry gas composition is selected as the basic composition. The overall performance of the integrated co-gasification system is reflected by the GSE, which is defined in Eq. (10).

$$GSE = \frac{m_{syg} \times LHV_{syg} + Q_{gsr} + Q_{rfm} + Q_{cr-1} + Q_{cr-2} + Q_{cr-3} + W_{tr}}{m_{fds} \times LHV_{fds} + Q_{bli} + Q_{abr} + W_{pmp-1} + W_{cp-1} + W_{cp-2} + W_{cp-3}} \quad (10)$$

where, m, LHV, W and Q represent the mass flow rate, the lower heating value, the energy rate and the heat rate, respectively. The subscript syg and fds are the syngas and the feed stock, respectively. The subscript gsr, rfm, bli, and abr represent the gasifier, the reformer, the boiler and the absorber, respectively. The subscript cp-1, and cp-3 correspond to the compressor for the $CO_2$ gasifying agent and the $CO_2$ product, respectively, while the subscript cp-2 represents the $O_2$ compressor for gasifying agent. The subscript tr, cr-1, cr-2 and cr-3 are the syngas turbine, the cooler-1, the cooler-2 and the cooler-3, respectively.

In order to upgrade the gasification performance, pure $O_2$ (95% purity) is selected for gasifying agent instead of air due to its ability to bring higher gasification temperatures as compared to gasification with air. The present gasification process consumes about 30 kWh of energy for production of a ton of $O_2$. In addition, the $CO_2$ absorber requires about 3 MJ of energy per ton $CO_2$ absorbed. $CO_2$ absorbers are known and are incorporated by reference to Hussain A, Follmann M, Melin T, Hagg M B. $CO_2$ removal from natural gas by employing amine absorption and membrane technology—A technical and economic analysis. Chem Eng J 2011; 172:952.

CGE represents the conversion of energy content in the feedstock to the usable energy in terms of heating value of the syngas. It is defined by the ratio of recoverable energy from the syngas to the energy of the feedstock and steam enthalpy, as defined by Eq. (15).

$$CGE(-) = \frac{m_{syg} \cdot LHV_{syg}}{m_{fds} \cdot LHV_{fds} + H_{ste} \cdot m_{ste}} \quad (11)$$

where, $H_{ste}$ and $m_{ste}$ are steam enthalpy and mass flow rate of steam.

The $H_2$ and CO compositions in the syngas are used as the main parameters for validation. Earlier studies have been considered as references for benchmarking the accuracy of the present study. In these studies the models were developed in Aspen Plus simulating the gasification of solid fuels. The simulations accurately predicted the experimental syngas compositions under similar reaction conditions; see Adnan M A, Hossain M M. Gasification of various biomasses including microalgae using $CO_2$—A thermodynamic study. Renew Energ 2018, and Chaiwatanodom et al. (2014) both incorporated by reference. For the present disclosure, the operating conditions and the properties of the feed are similar to those considered in both Adnan and Hossain and Chaiwatanadom. In addition, the gasifying agents used (steam, $O_2$ and $CO_2$) are common to those in the above references.

Table 3 compares the syngas compositions of the present disclosure with those reported in Adnan and Hossain and Chaiwatanadom et al. under same reaction temperatures. The relative errors of the present results for CO and $H_2$ (syngas) concentrations are lower than 6% indicating that good agreement with Adnan and Hossain and Chaiwatanadom et al.

The compositions of the syngas from the present disclosure at 800-1200° C. are also close to the syngas compositions as reported in other studies. Adnan et al., Enhancement of hydrogen production in a modified moving bed downdraft gasifier—A thermodynamic study by including tar. Int J Hydrogen Energy (2017); and Susanto et al. (1996).

TABLE 3

Composition of the producer gas at various temperatures.

| | Our work | Chaiwatanodom et al. | Adnan et al. | Error | Error |
|---|---|---|---|---|---|
| T = 800° C. | | | | | |
| $H_2$ | 30.45% | 31.00% | 31.30% | 1.81% | 2.79% |
| CO | 63.20% | 59.80% | 62.20% | 5.38% | 1.58% |
| $CO_2$ | 5.97% | 9.00% | 6.00% | n.c. | n.c. |
| $CH_4$ | 0.38% | 4.30% | 0.40% | n.c. | n.c. |
| T = 1000° C. | | | | | |
| $H_2$ | 30.33% | 30.30% | 31.60% | 0.10% | 4.19% |
| CO | 67.00% | 62.40% | 63.70% | 6.87% | 4.93% |
| $CO_2$ | 2.66% | 7.30% | 4.70% | n.c. | n.c. |
| $CH_4$ | 0.01% | 5.90% | 0.00% | n.c. | n.c. |
| T = 1200° C. | | | | | |
| $H_2$ | 30.04% | 29.40% | 31.70% | 2.13% | 5.53% |
| CO | 67.74% | 64.30% | 63.70% | 5.07% | 5.96% |
| $CO_2$ | 2.22% | 6.30% | 4.70% | n.c. | n.c. |
| $CH_4$ | 0.00% | 7.10% | 0.00% | n.c. | n.c. | n.c.: not calculated
Column 3 of Table 3 refers to Chaiwatanodom P, Vivanpatarakij S, Assabumrungrat S. Thermodynamic analysis of biomass gasification with CO₂ recycle for synthesis gas production. Appl Energ 2014; 114: 10; and Kim J, Henao C A, Johnson T A, Dedrick D E, Miller J E, Stechel E B, et al. Methanol production from CO₂ using solar-thermal energy: process development and techno-economic analysis. Eerg Environ Sci 2011; 4: 3122. Column 4 of Table 3 refers to Adnan M A, Hossain M M. Gasification of various biomasses including microalgae using CO₂ - A thermodynamic study. Renew Energ 2018; 119: 598.

The inventors selected a non-adiabatic reaction condition for all processes. The temperature of main reactors including gasifier (GSR) and reformer (RFM) were maintained at 973 K (700° C.) and 1073 K (800° C.), respectively. A discussion of the parametric study is presented herein, including the model description.

The molar flow rates of the feed and the product streams of the four main process in the integrated co-gasification system are shown in FIG. 2. It can be clearly seen in FIG. 2A that the flow rate of the biomass in the out streams diminished while the flow rate of carbon, $H_2O$, $N_2$, $O_2$ and $H_2$ considerably increased due to the decomposition process. Indeed, the main purpose of decomposition process was to convert the biomass into smaller molecules, which are reactive with In FIG. 2B, it can be seen that the char flow rate is drastically decreased in the product stream. The similar trends are also found for the $H_2O$ and $O_2$ flow rates. These results indicate that the partial oxidation reaction Eq. (1) and steam reforming reaction Eq. (3) dominate the gasification process. This is also confirmed by the increase of CO and $H_2$ flow rates in the product stream. The increase of $CO_2$ is mainly due to the CO combustion Eq. (6) and water gas shift Eq. (7) reactions occurred in the gasification unit.

In the reforming unit, methane reacted with steam and $CO_2$ in methane-steam reforming reaction Eq. (8) and methane-$CO_2$ reforming reaction Eq. (9), respectively, producing an additional amount of CO and $H_2$.

Figure 2A:
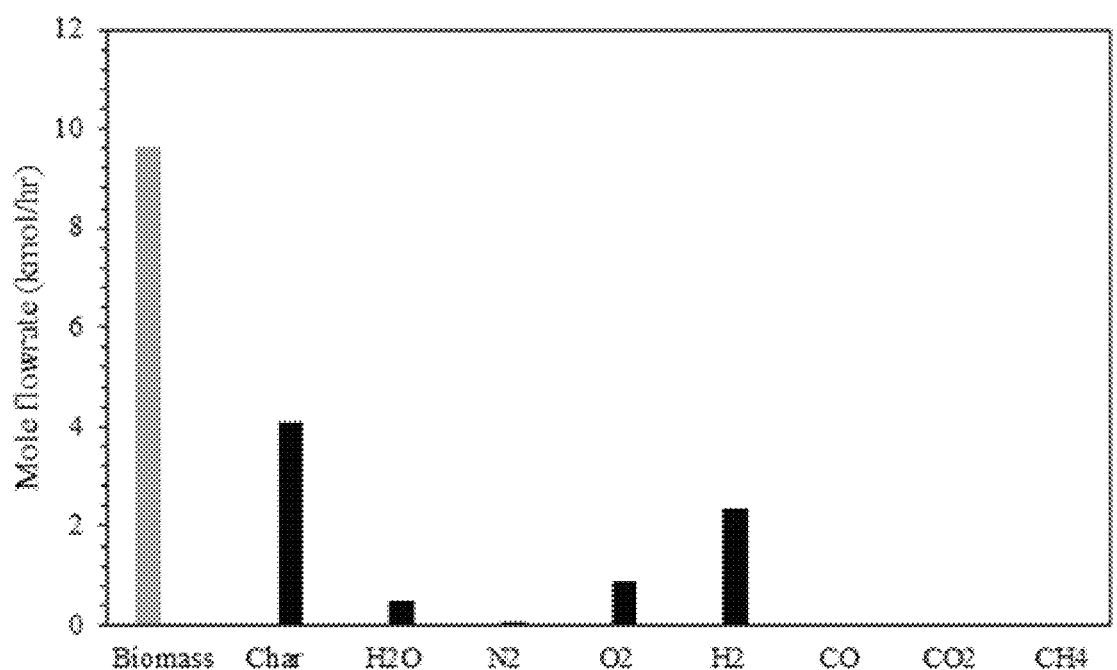
FIGS. 2A-2D. Mole flow of the feed and product of (FIG. 2A) pyrolysis, (FIG. 2B) gasification, (FIG. 2C) reforming, and (FIG. 2D) syngas treatment. (feed: grey; product: black).
Figure 2B:
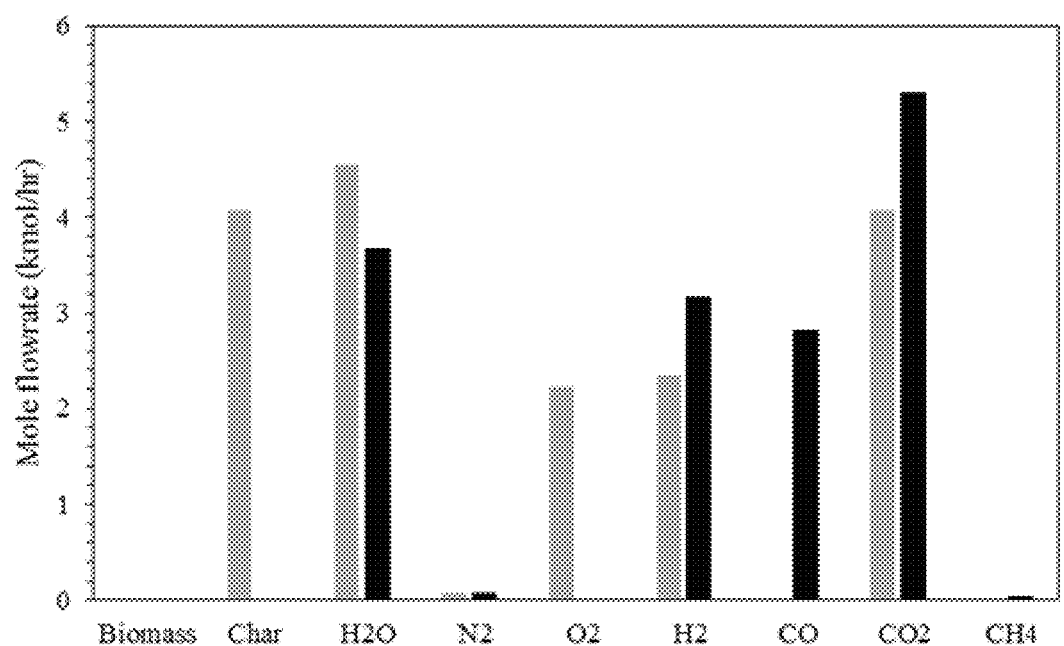
Figure 2C:
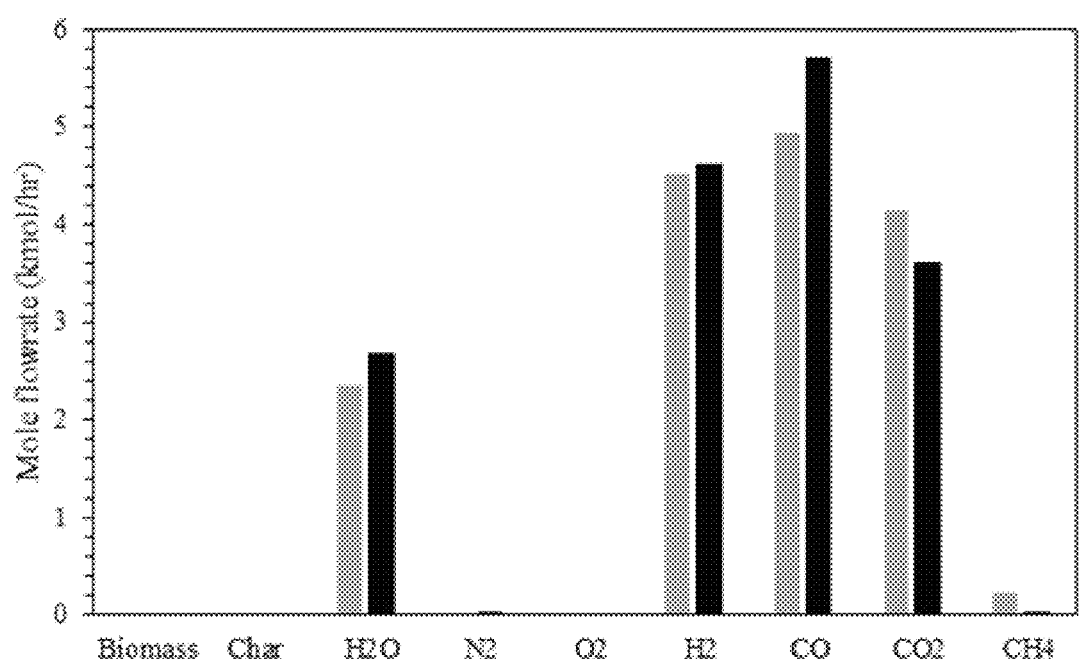

The contribution of the methane reforming reactions are confirmed by the increase of CO and H2 flow rates in the product stream as depicted in FIG. 2C.

Figure 2D:
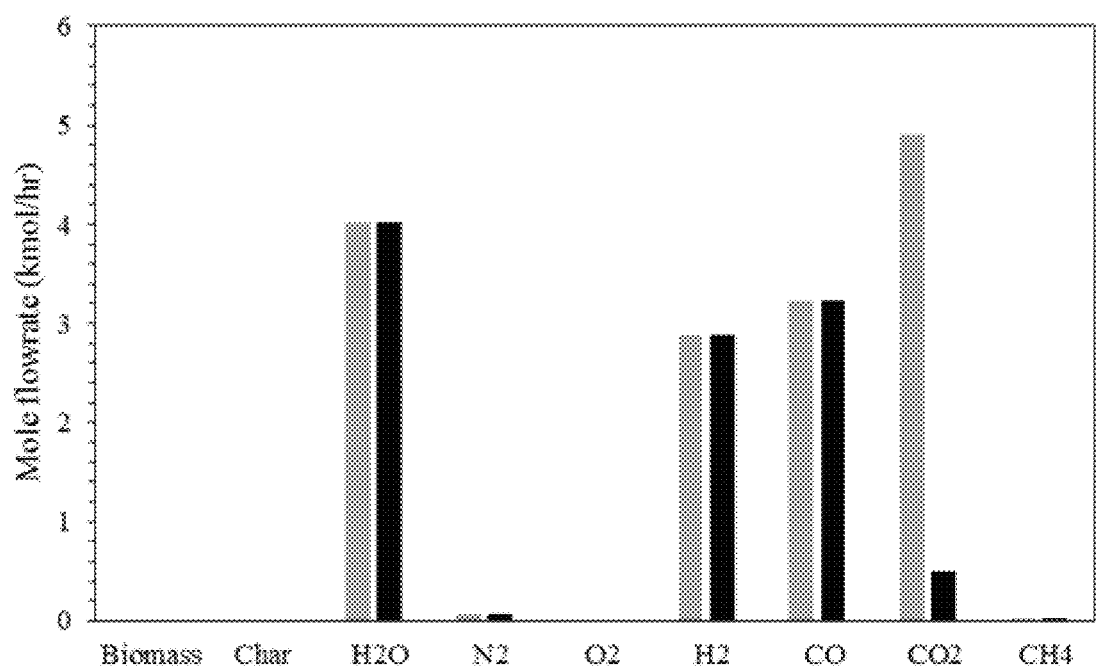

As a consequence, $CO_2$ and $CH_4$ in the feed stream were consumed, which was reflected in the decreased flow rates of $CO_2$ and $CH_4$ in the product stream. The H2 and CO compositions of the syngas further increased at the outlet of CO2 absorption unit (FIG. 2D).

The use of $H_2O$, $O_2$ and $CO_2$ as gasifying agents improves the syngas quality. The selection of these gasifying agents ($H_2O$, $O_2$ and $CO_2$) also helps minimize the NOx formation by avoiding the contact between nitrogen and the gasified products as usually observed in gasification using air.

On the other hand, the use of microalgae biomass also minimizes $SO_x$ emission, as its sulfur content is significantly lower than that of coal. Consequently, the $SO_x$ concentration in the syngas is significantly lower than the allowable $SO_x$ concentration outlined in the US EPA regulations.

The $O_2$ equivalence ratio (ER ratio) is defined as the weight ratio of actual $O_2$ to feed ratio per stoichiometric $O_2$ to feed ratio. The gasifying agents (steam, $CO_2$ and $O_2$) have significant influence on the gasification performance. The use of pure $O_2$ as the gasifying agent provides higher gasification temperature as compared to air. The influence of oxygen on performance of the integrated gasification process was investigated by introducing various amount of $O_2$ to the gasifier from an $O_2$ equivalence ratio (ER) of 0.0 to 1.0. The feed flow rate and steam to carbon molar ratio (S/C ratio) maintained at 100 kg/h and unity, respectively. At this stage, steam and $CO_2$ were introduced with a constant $CO_2$:C of unity.

The use of pure $O_2$ requires higher energy for $O_2$ separation (from air) as compared to the use of air. Tijmensen et al. (2002). This energy for $O_2$ purification was taken into account in overall performance analysis.

Figure 3A:
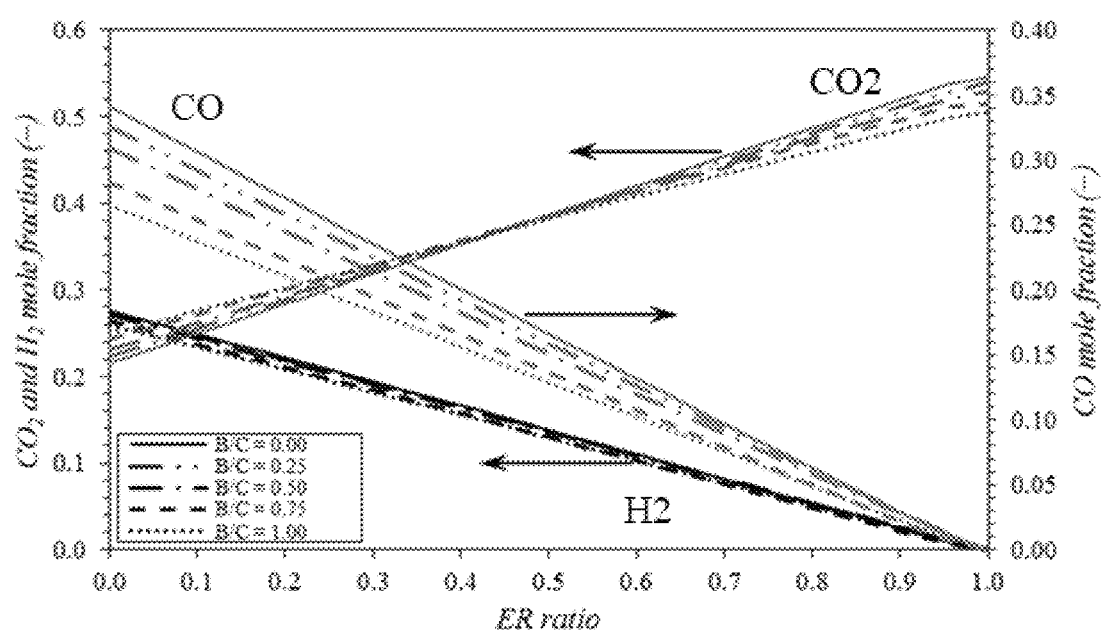
FIGS. 3A-3C. The effect of $O_2$ equivalence ratio on the composition of syngas at different pressures.

It can be seen in FIG. 3A that the concentration of $H_2$ and CO decreased while the concentration of $CO_2$ increased as the $O_2$ equivalence ratio (ER) was increased from 0.0 to 1.0 for all combinations. For instance, in gasification of Indonesian coal (B/C=0), CO and $H_2$ concentrations decreased from 0.34 to 0.0 and 0.28 to 0.0, respectively, as the $O_2$ equivalence ratio (ER) was increased from 0.0 to 1.0. This is due to the fact that the presence of $O_2$ promotes further oxidation of $H_2$ and CO in combustion reactions (Eq. (5) and Eq. (6)). This is further confirmed by the increase of $CO_2$ concentration as depicted in FIG. 3A.

The biomass/coal (B/C) ratio also has a considerable influence on the composition of the syngas. As it can be observed in FIG. 3A, as the B/C ratio was increased, with same $O_2$ equivalence ratio (ER) the concentration of $H_2$ and CO decreased. This is due to the fact that higher B/C ratio resulted higher $O_2$ concentration in the gasification feed stock. Indeed, the presence of higher amount of $O_2$ converts $H_2$ and CO into $H_2O$ (Eq. (5)) and $CO_2$ (Eq. (6)), respectively. This is further confirmed by increasing $CO_2$ concentration as the B/C ratio was increased.

Figure 4A:
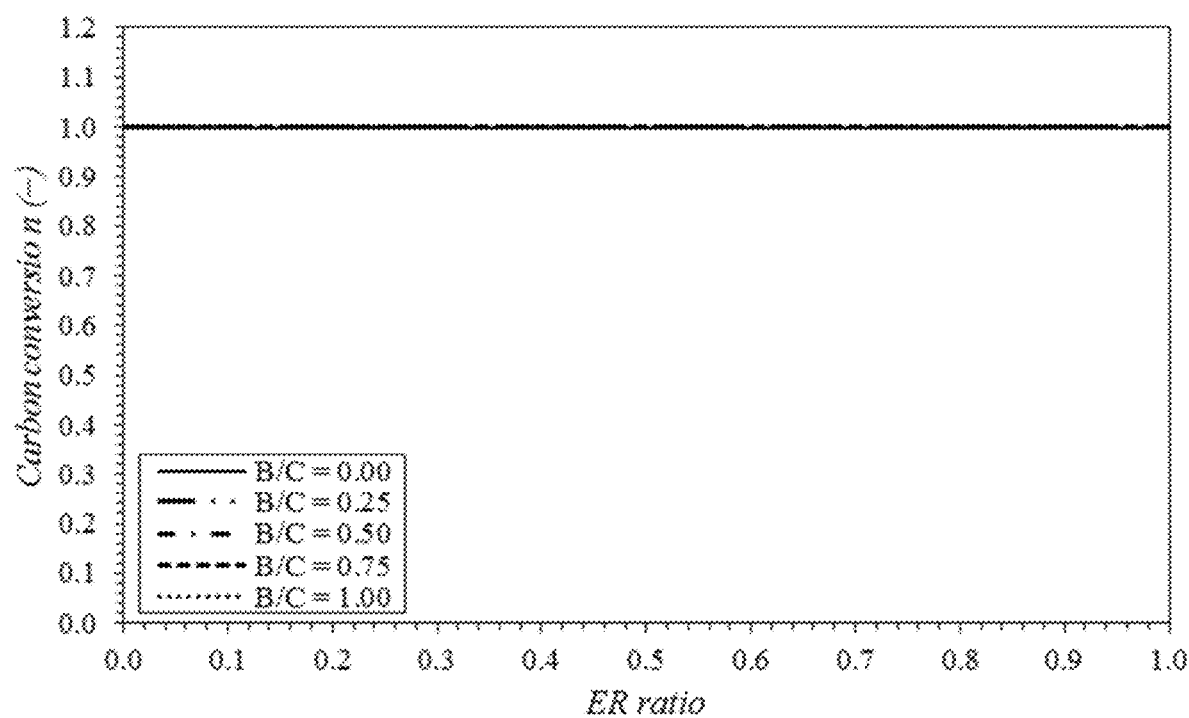
FIGS. 4A-4C. The effect of equivalence ratio on carbon conversion at different pressures.
Figure 4B:
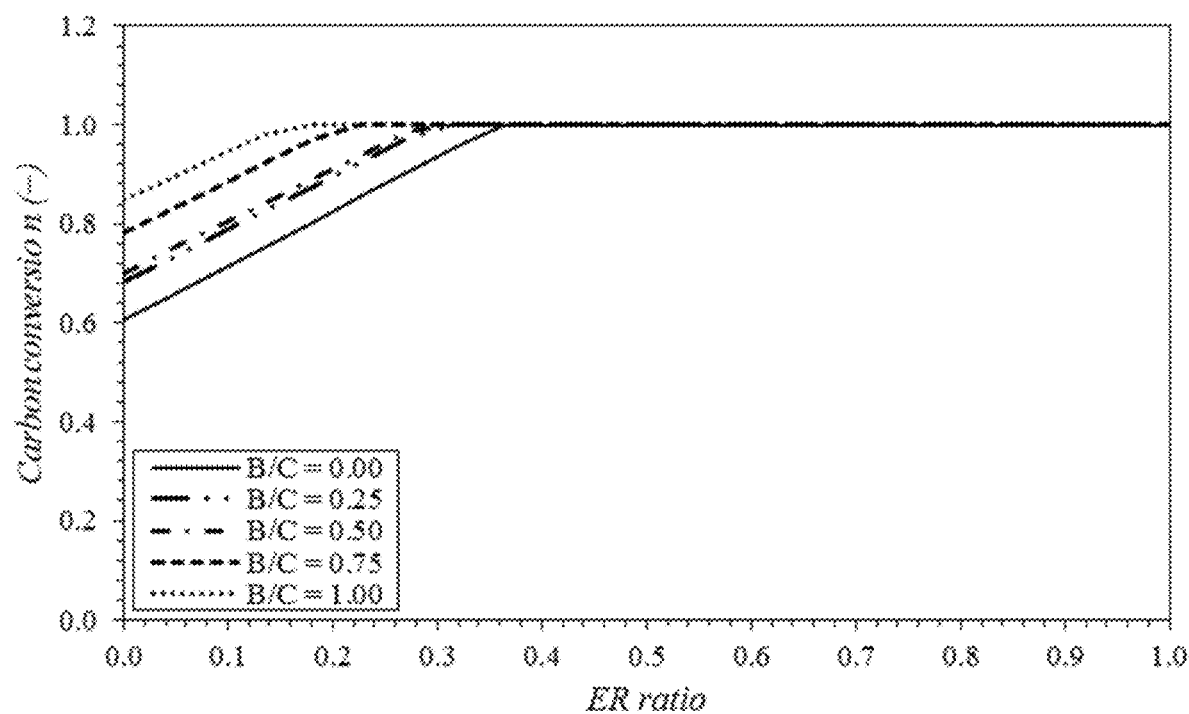
Figure 4C:
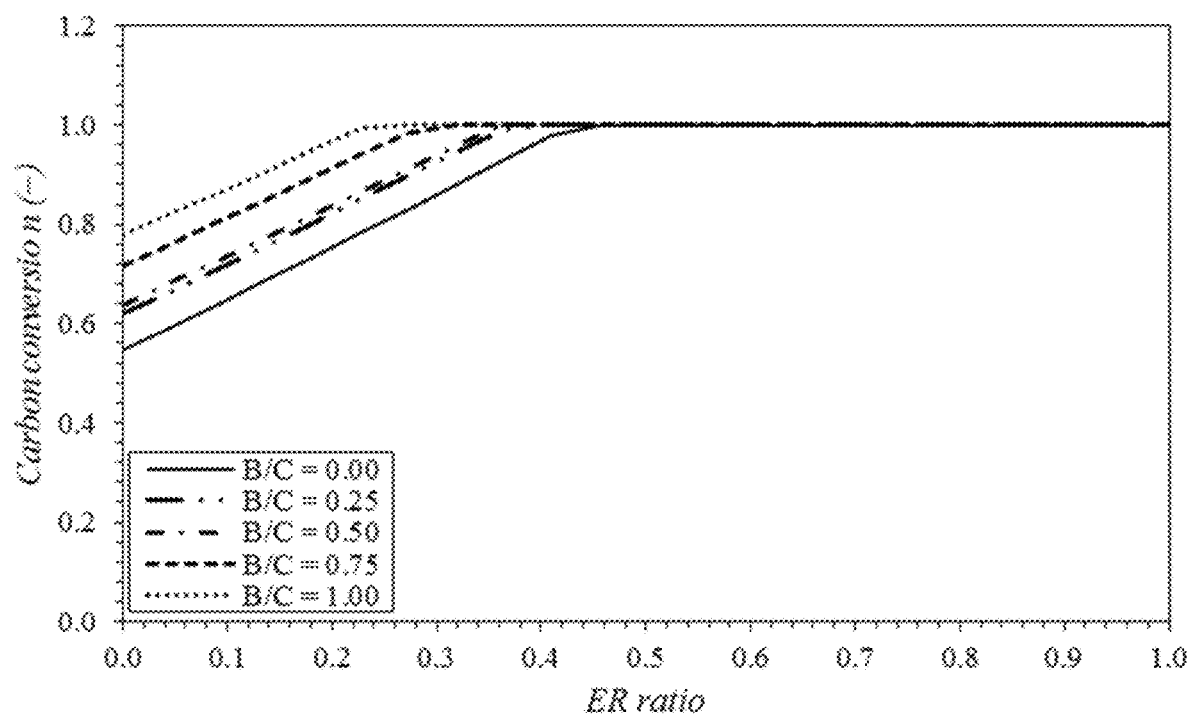

In addition, FIGS. 4A-4C confirmed that a complete carbon conversion was found on lower $O_2$ equivalence ratios (ER) with the higher oxygen containing feedstocks. The minimum effect of B/C ratio on syngas composition was observed in high $O_2$ equivalence ratio (ER) (e.g., ER ratio=1.0). This indicates that inference of oxygen concentration in the biomass was less prominent when the additional oxygen was supplied to the gasifier. Comparable results were also found in biomass gasification by injecting $CO_2$ as the gasifying agent.

Figure 3B:
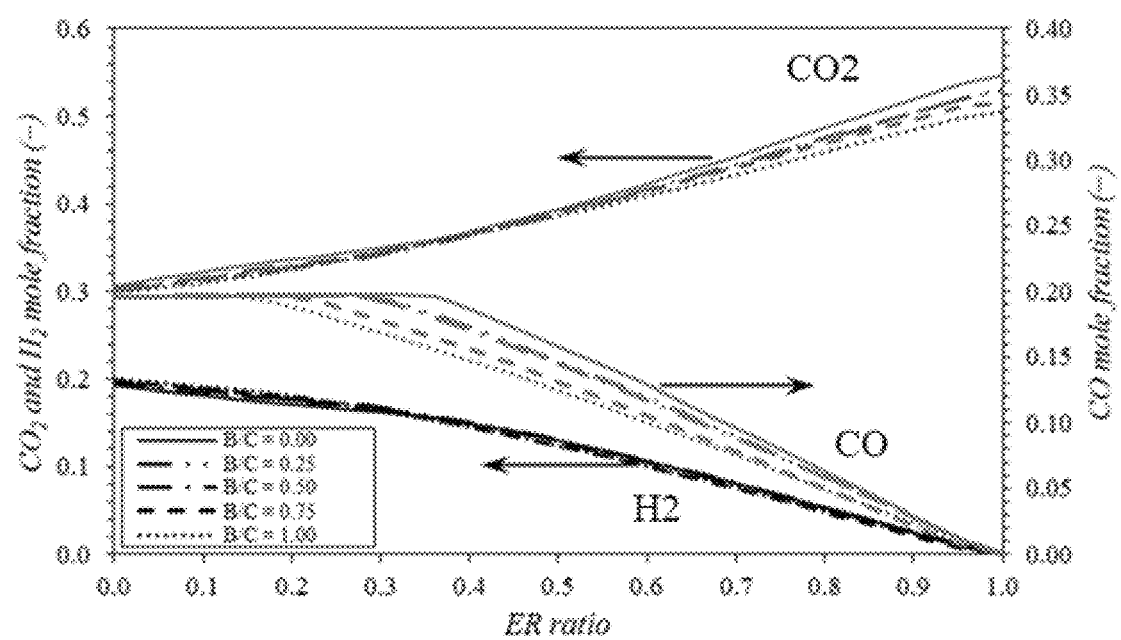
Figure 3C:
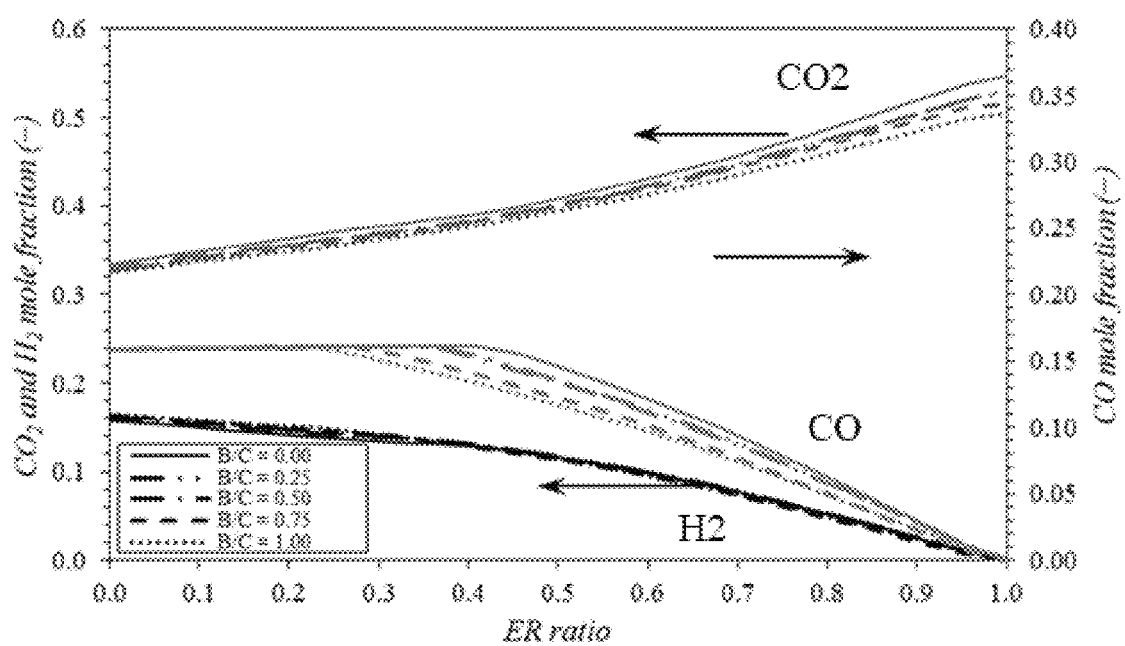

As it can be seen in FIG. 3A-3C, the pressure has significant influence on the gasification of biomass at low $O_2$ equivalence ratio (ER). For example, in the gasification of *N. oculata* (B/C ratio=1.00) with $O_2$ equivalence ratio (ER) of 0, the concentration of CO significantly decreased from 0.26 to 0.16 as the pressure was increased from 1 bar to 50 bar. A similar trend was observed for $H_2$ concentration, which decreased from 0.26 to 0.16 at the same above gasification conditions. This decreased $H_2$ and CO concentrations are related to the high pressure inhibition effects on the reforming reactions (Eq. (3), Eq. (8) and Eq. (9)). The adverse effect of pressure is further confirmed by observing the decreased carbon conversion at higher operating pressure, as depicted in FIG. 4A-4C. However, the pressure has minimal influences on the composition of the syngas at high $O_2$ equivalence ratio (ER). For example, in the gasification of *N. oculata* (B/C ratio=1.00) with $O_2$ equivalence ratio (ER) of 0.36, $H_2$ and CO concentrations slightly decreased from 0.16 to 0.13 and 0.17 to 0.14, respectively, as the pressure was increased from 1 bar to 50 bar. At these conditions $CO_2$ concentration slightly augmented from 0.35 to 0.37.

The single phase reaction that occurs at high $O_2$ equivalence ratio (ER) is mainly responsible for minimal change given the complete carbon conversion already has been achieved. Indeed, the pressure has stronger effect on the solid-gas reaction as opposed to the gas-gas reaction due to minimum mass transfer inference. A similar trend is also found in the co-gasification using the mixed feed stock at other B/C ratios (B/C ratios=0.0, 0.25, 0.50 and 0.75). These findings showed strong effect of pressure at low $O_2$ equivalence ratio (ER) and minimal effect of pressure at high $O$ $O_2$ equivalence ratio (ER) on gasification performance.

Figure 5A:
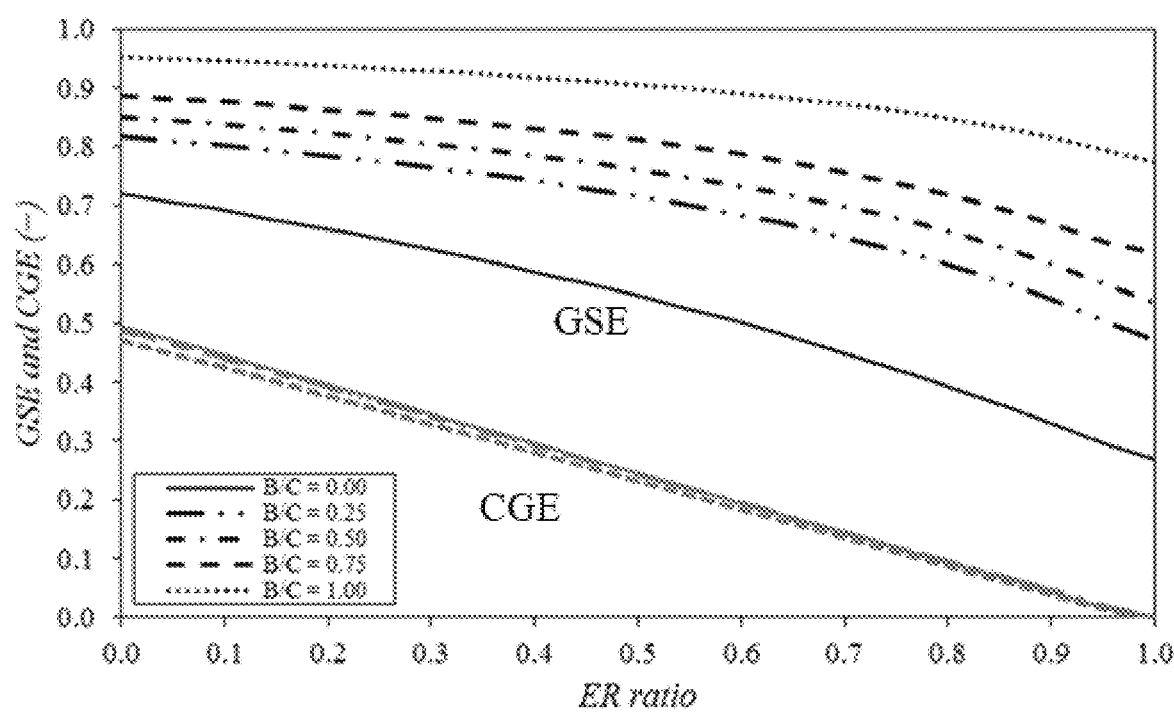
FIGS. 5A-5C. The effect of equivalence ratio on GSE (black) and CGE (red) at different pressures.
Figure 5B:
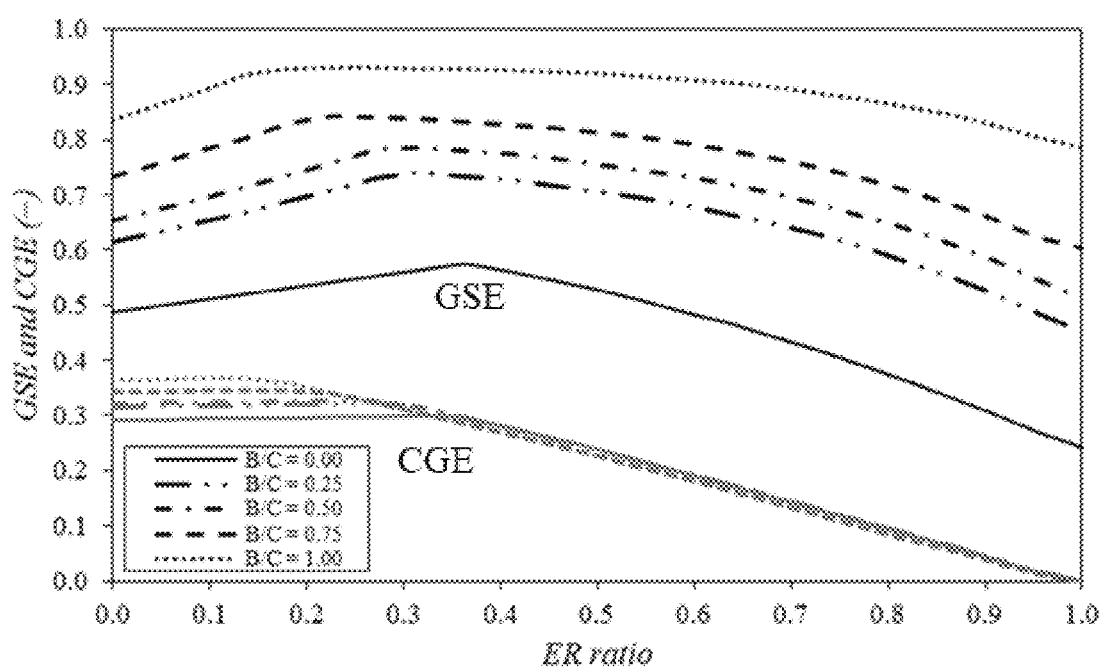
Figure 5C:
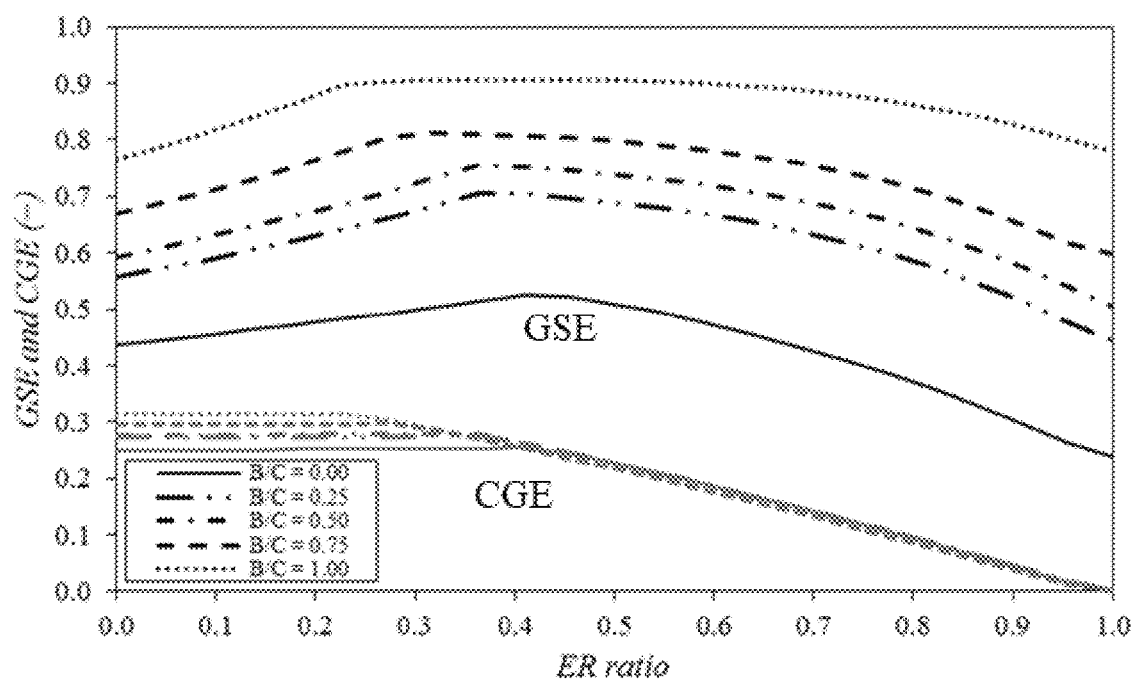

The $O_2$ equivalence ratio (ER) significantly influenced the GSE of the gasification system, as depicted in FIG. 5. It can be clearly seen in FIG. 5A that the GSE decreased as the $O_2$ equivalence ratio (ER) was increased. This result can be explained by the fact that the concentration of combustible gases (mainly H2 and CO) in the syngas decreased as the $O_2$ equivalence ratio (ER) was increased (FIG. 3). It can be noticed that the B/C ratio has a significant effect on GSE. The increase of B/C ratio has positive effects on the GSE as shown in FIG. 5A. For example, the GSE increased from 0.72 to 0.95 as the B/C ratio was raised from 0.0 to 1.0 at gasification pressure of 1 bar and $O_2$ equivalence ratio (ER) of zero. This is due to the fact that the Indonesian coal has a higher heating value than that of *N. oculata*, as shown in Table 1. By comparing the FIGS. 5A-5C, one can notice that the pressure has negative influence on the GSE of the gasification system. For instance, in the gasification of coal (B/C ratio of 0) with ER ratio of unity, the GSE decreased from 0.27 to 0.24 as the pressure was increased from 1 bar to 50 bar. This is due to the fact that the increase of pressure leads to maximum concentration of non-combustible elements ($CO_2$ and $H_2O$). In addition, the performance of the compressors is inferior to the gas turbine as it extracted energy from high-pressure syngas.

The $O_2$ equivalence ratio (ER) has a great deal of influence on the CGE, as depicted in FIG. 5. For instance, in gasification of *N. oculata* (B/C ratio=0.0) at 25 bar, the CGE remained constant at 0.36 as the $O_2$ equivalence ratio (ER) was increased from 0.0 to 0.18. Further increase of $O_2$ equivalence ratio (ER) reduced the CGE from 0.18 to 0.0. This is due to the fact that the concentration of $H_2$ and CO were constant until the $O_2$ equivalence ratio (ER) is sufficient to reach a complete carbon conversion ($O_2$ equivalence ratio (ER)=0.18), as depicted in FIG. 4B. The additional supply of oxygen after a complete carbon conversion leading to combustion of H2 and CO and resulting to decrease their concentrations. A similar trend was found in the gasification with other B/C ratios.

The effect of steam on gasification performance was conducted by varying the steam flow rate at a constant feed flow rate and $O_2$ equivalence ratio (ER) of 100 kg/h and 0.36, respectively. The steam to carbon ratio (S/C ratio) is defined as the molar ratio of steam to carbon in the feed stock.

Figure 6A:
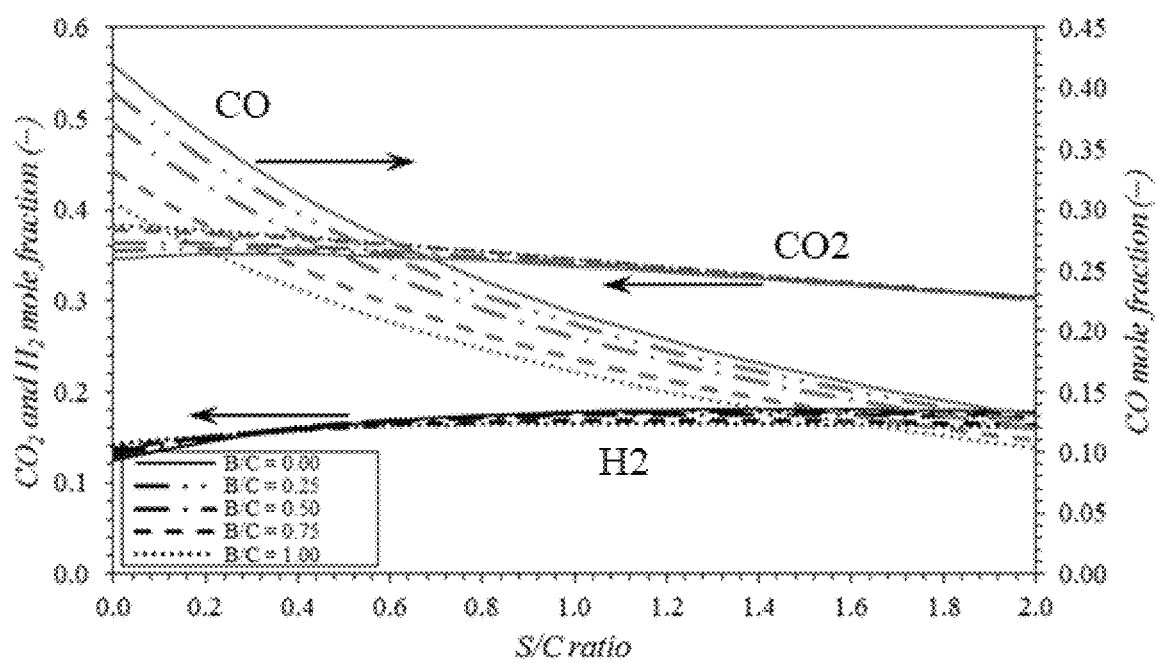
FIGS. 6A-6C. The effect of S/C ratio on the composition of syngas at different pressures.

FIG. 6 shows the effect of the S/C ratio on syngas composition at various B/C ratio and different pressures (1 bar, 25 bar and 50 bar). One can see in FIG. 6A that $H_2$ concentration increased while concentrations of CO and $CO_2$ decreased as the S/C ratio was increased. For example, in gasification of *N. oculata* (B/C ratio=1.00) at 1 bar, H2 concentration increased from 0.14 to 0.16, while CO and $CO_2$ concentrations decreased from 0.31 to 0.10 and 0.38 to 0.30, respectively, as the S/C ratio was increased from 0.00 to 2.00. These results indicate that the additional steam supply promotes steam reforming reaction Eq. (3) and water-gas shift reaction (Eq. (7)). In addition, the introduction of steam enhances hydrogen source during gasification.

Figure 6B:
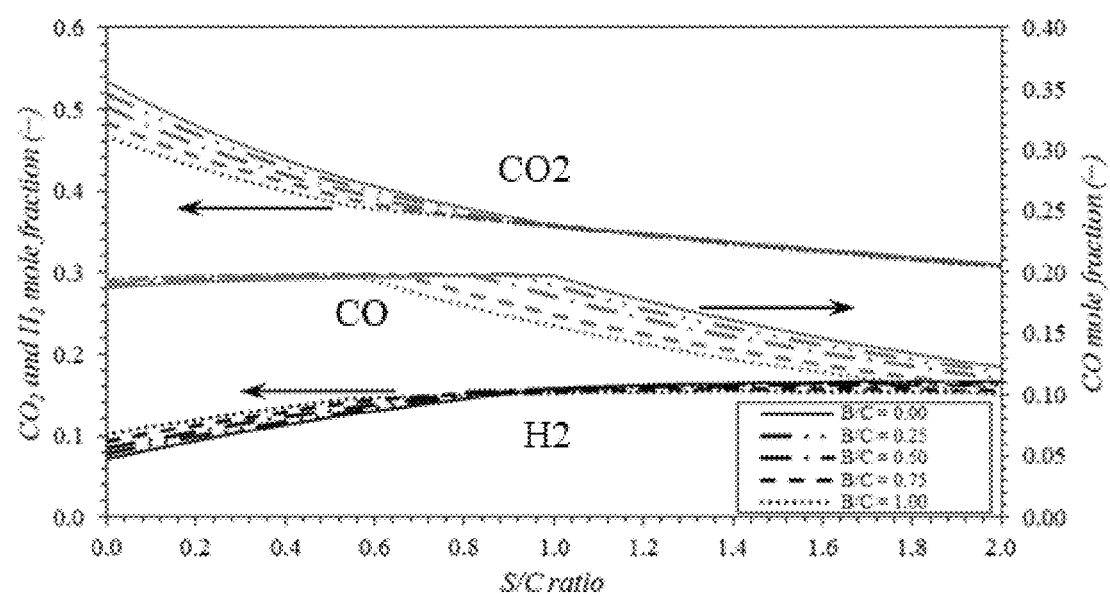
Figure 6C:
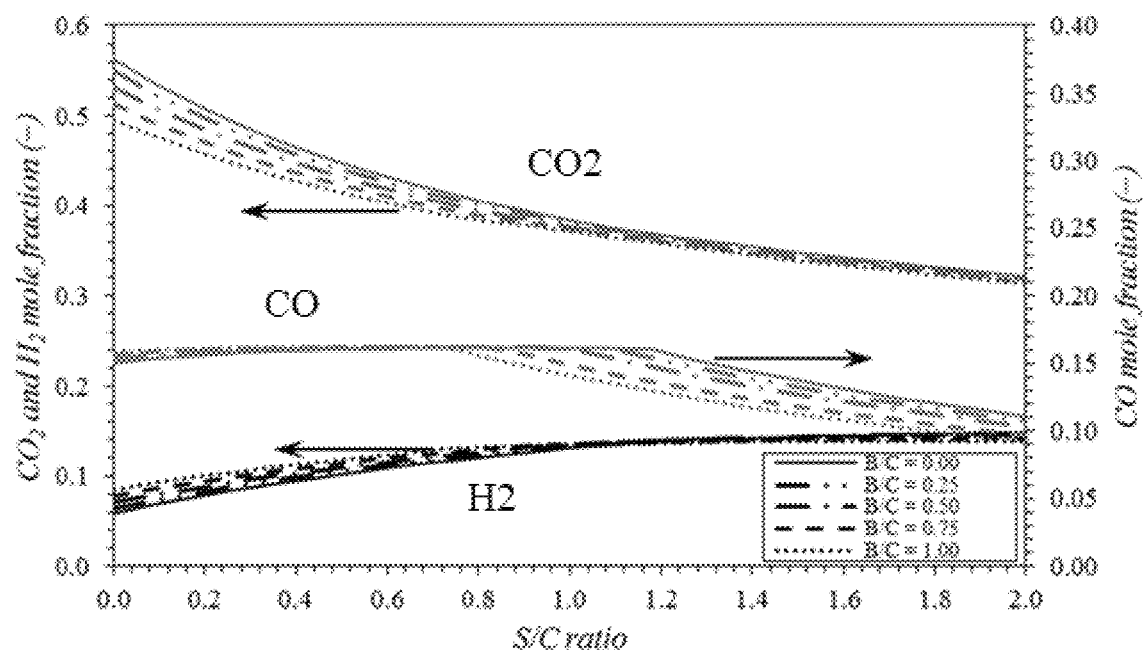
Figure 7A:
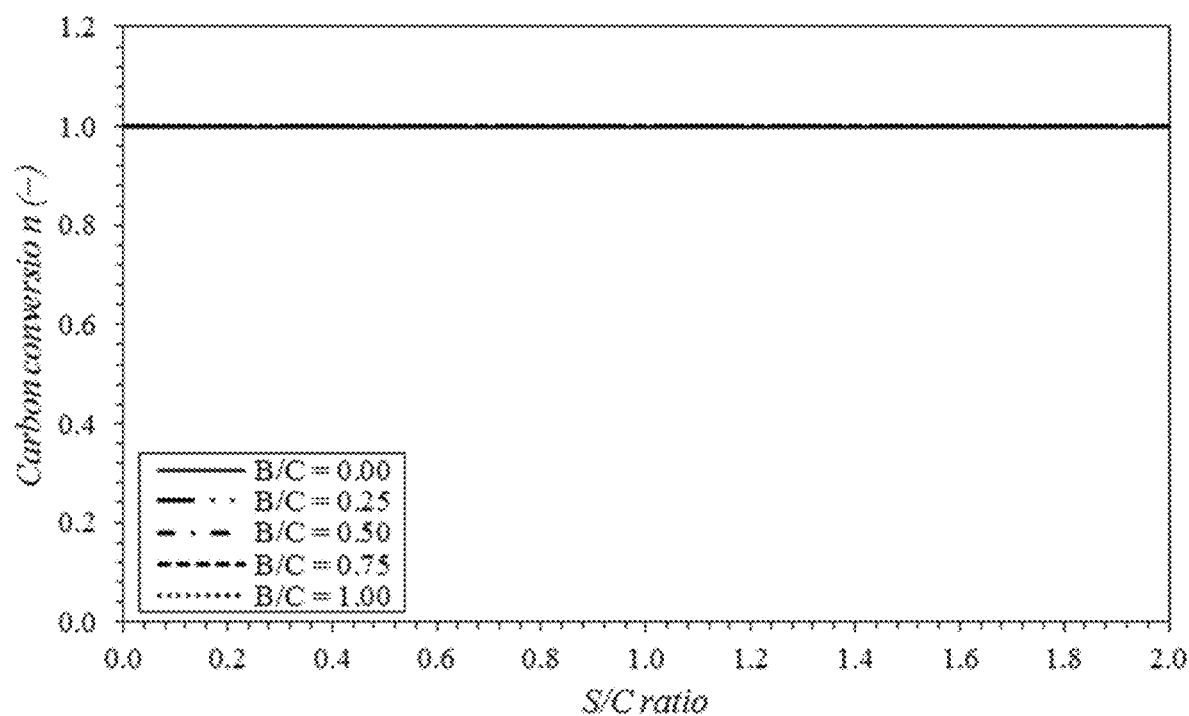
FIGS. 7A-7C. The effect of S/C ratio on carbon conversion at different pressures.
Figure 7B:
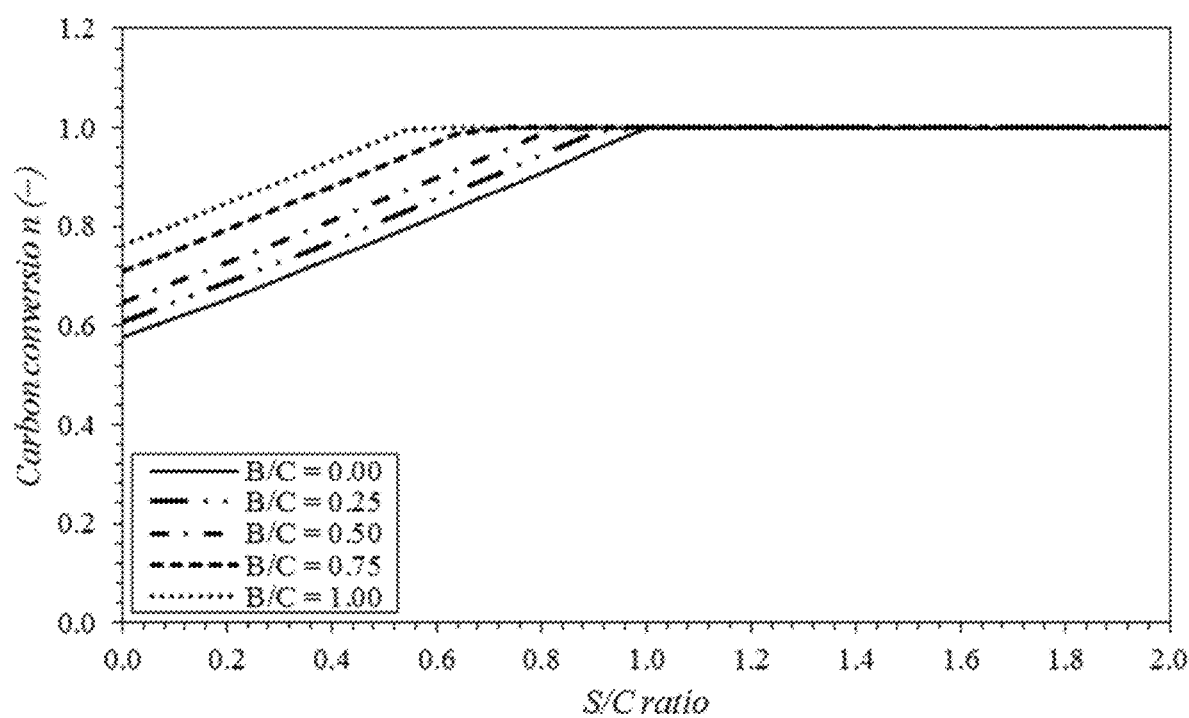
Figure 7C:
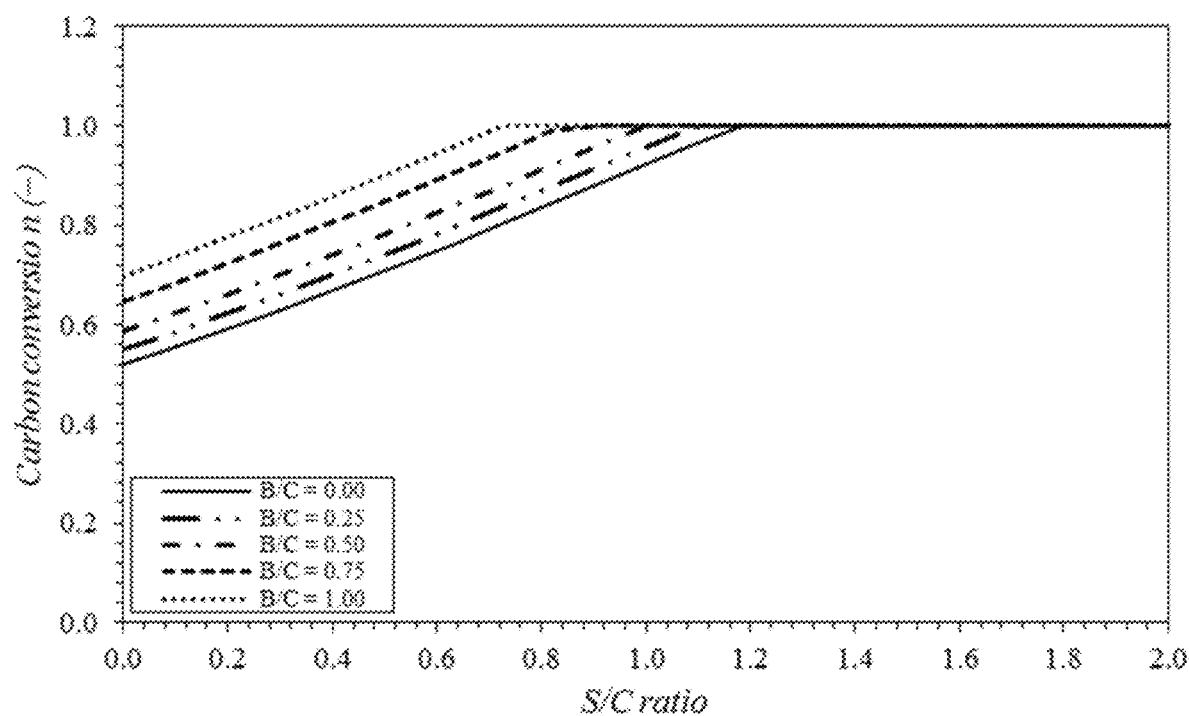

The syngas composition varied as the pressure varied from 1 bar to 25 bar, and then to 50 bar, as seen in FIGS. 6A-6C. These results indicate that the pressure also has a strong influence on the composition of syngas. For instance, in gasification of *N. oculata* (B/C ratio=1.00) at 25 bar, H2 concentration increased as S/C ratio was increased from 0.00 to 2.00. On the other hand, CO concentration slightly increased from 0.19 to 0.20 as the S/C ratio was elevated from 0.0 to 0.55. The excess amount of steam enhanced water-gas shift reaction (Eq. (7)) is mainly contributed to the enhanced $H_2$ and CO concentrations. A similar pattern was observed in gasification at 50 bar with a different optimum S/C ratio. This is confirmed by the increase of carbon conversion with increasing of S/C ratio, as depicted in FIG. 7(*b, c*). It is worth noting that a complete carbon conversion was found in gasification at 1 bar at S/C ratio of 0.0 to 2.0, as depicted in FIG. 7A. Under the present gasification conditions, $O_2$ supply (ER ratio of 0.36) was sufficient to achieve a complete carbon conversion. The increase of S/C ratio higher than 0.55 led to an adverse effect on CO concentration, which reflected by the decrease of CO concentration from 0.20 to 0.10 as the S/C ratio was increased from 0.55 to 2.00.

Again, the B/C ratio has a considerable effect on the syngas composition. As it can be seen in FIG. 6A, the composition of syngas varied with the variation of B/C ratio. For example, concentration of CO decreased from 0.41 to 0.31 while concentration of H2 and CO augmented from 0.12 to 0.14 and 0.35 to 0.38, respectively, as the B/C ratio was increased from 0.00 to 1.00 with the S/C ratio of 0.00. Interestingly, at S/C ratio of 2.00, the B/C ratio has a minimal effect on CO2 concentration and an opposite trend was observed on CO concentration. These results indicate that higher B/C ratio provides higher $O_2$ supply for gasification from the feed stock itself, promoting the CO combustion reaction Eq. (6), which resulted higher $CO_2$ concentration.

One can see a different trend of CO concentration in gasification at 1 bar and 25 bar in FIG. 6A and FIG. 6B, respectively. A minimal effect of the B/C ratio was found in gasification at 25 bar with low S/C ratio. This indicates that the incomplete carbon conversion resulted in a minimal effect of B/C ratio on syngas composition. This is confirmed by the carbon conversion in FIG. 7B. The similar behavior also was observed on the gasification at 50 bar.

Figure 8A:
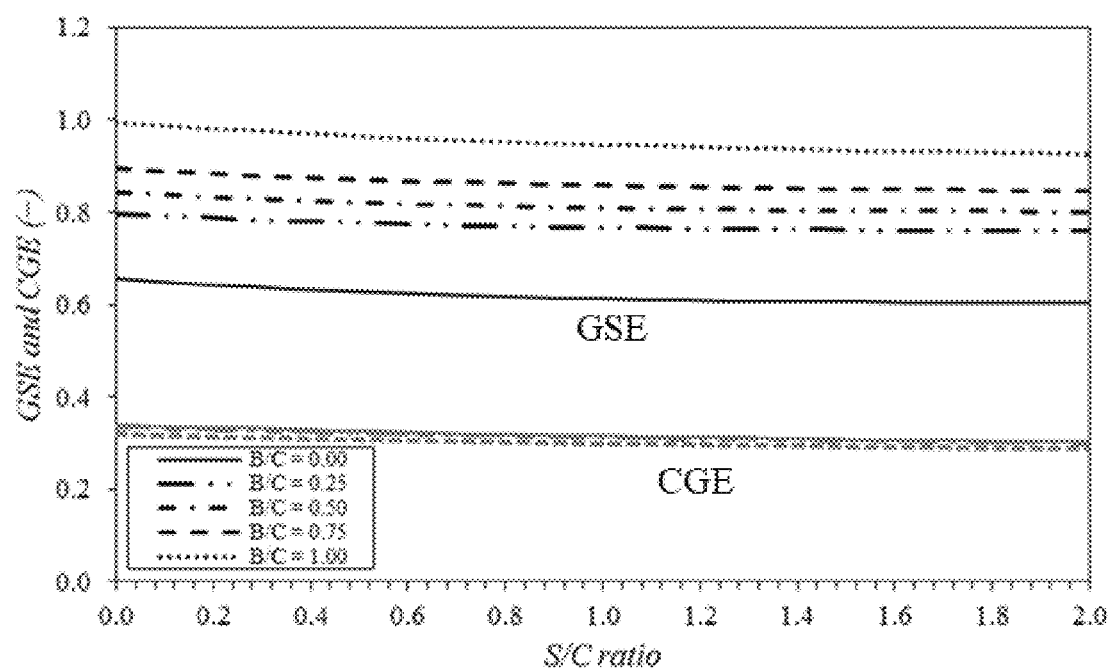
(FIG. 8A) 1 bar, (FIG. 8B) 25 bar and (FIG. 8C) 50 bar.

It can be clearly seen in FIG. 8A that the S/C ratio has a minimum effect on the GSE at 1 bar. For instance, in the gasification of *N. oculata* (B/C ratio=1.00), GSE slightly reduced 0.99 to 0.92 as the S/C ratio was elevated from 0.00 to 2.00. This result lays on the fact that the increase of heating value of the syngas by increasing H2 concentration was counterbalanced by the decrease of CO concentration. In addition, higher S/C ratios required higher amount of energy for steam generation.

Figure 8B:
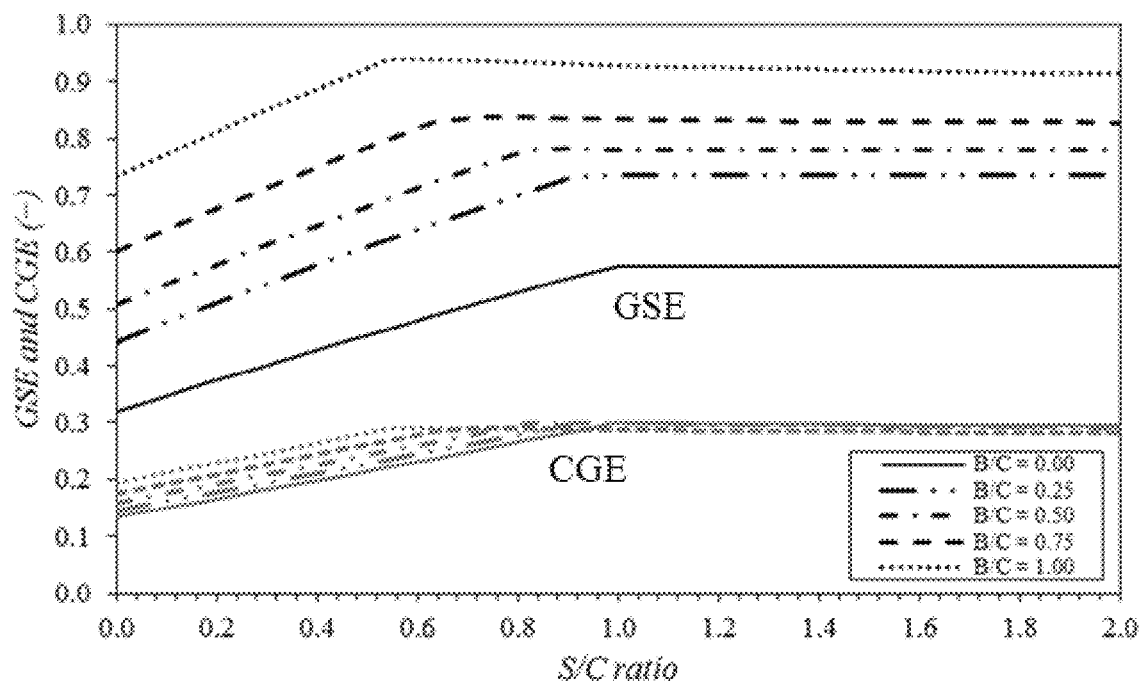

A similar pattern was found in gasification with other B/C ratios (i.e., B/C ratio of 0.00, 0.25, 0.50 and 0.75). Indeed, the B/C ratio significantly influenced the GSE of the gasification system. For instance, in the gasification at 1 bar, the GSE augmented from 0.66 to 0.99 when the B/C ratio was increased from 0.00 to 2.00. This is due to the fact that higher energy for $CO_2$-absorption was found on the lower B/C ratio. The difference of the GSE pattern was found at 1 bar and 25 bar, respectively (FIGS. 8A and 8B). This indicates that the GSE was significantly influenced by pressure. Interestingly, in gasification of *N. oculata* (B/C ratio=1) at 25 bar, the GSE increased from 0.73 to 0.94 when the S/C ratio was increased from 0.00 to 0.55. Further increase of S/C ratio up to 2.00 led to the slight decrease of GSE from 0.94 to 0.91. This is because the amount of combustible gases (i.e., $H_2$ and CO) increased as the product of steam reforming reaction Eq. (3) as the S/C ratio was elevated from 0.00 to 0.55. As the S/C ratio was further increased to 2.00, the steam reforming reaction stopped due to the absence of carbon. This is confirmed by showing a complete carbon conversion was achieved at the S/C ratio of 0.55 (FIG. 7B). The similar fashion was also found on the gasification at 50 bar and other B/C ratios (i.e., B/C ratio of 0.00, 0.25, 0.50 and 0.75).

Figure 8C:
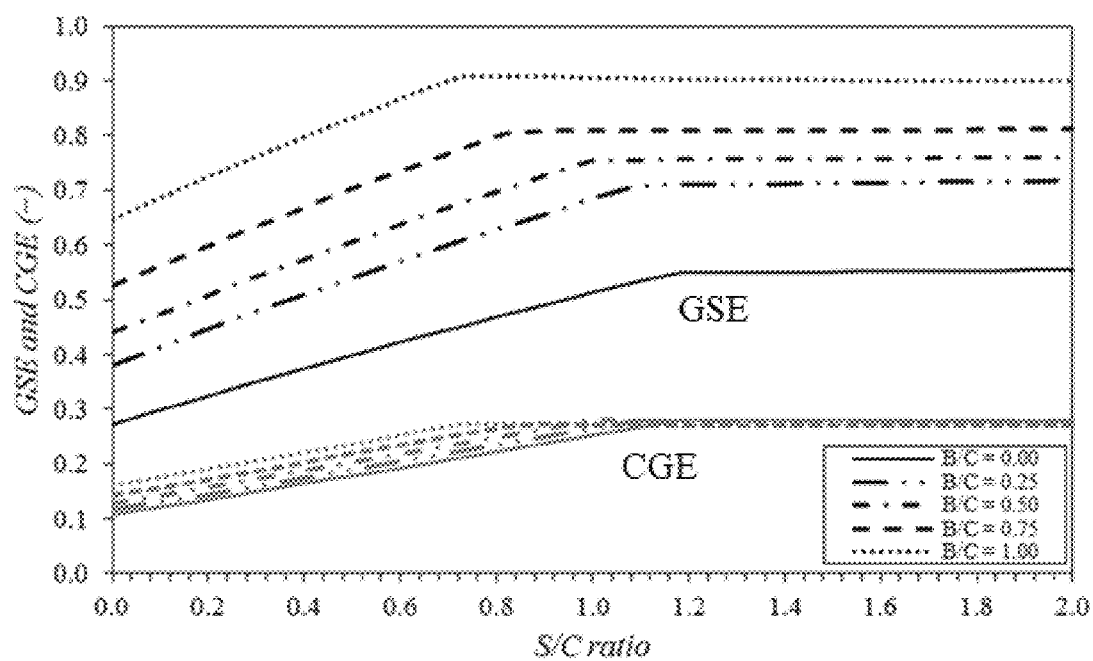

Again, the CGE was slightly affected by the S/C ratio in gasification at 1 bar, as indicated in FIG. 8a. For example, in gasification of *N. oculata* at 1 bar, the CGE slightly decreased from 0.32 to 0.29 as the S/C ratio was elevated from 0.00 to 2.00. The strong influence of S/C ratio on the CGE was found on the gasification at 25 bar and 50 bar, as depicted in FIG. 8B and FIG. 8C, respectively. For instance, the CGE significantly augmented from 0.19 to 0.29 when the S/C ratio was increased from 0.00 to 0.55, and a slight decrease of CGE from 0.29 to 0.28 when the steam was further added to S/C ratio of 2.00. The reason of this lays on the fact that the CGE was significantly impressed by composition of the syngas. This is further confirmed by the composition of syngas as indicated in FIG. 6A, FIG. 6B and FIG. 6C.

As shown herein, an integrated biomass and coal gasification process has been developed using Aspen Plus, combining gasification, reforming and $CO_2$-absorption to produce a high quality syngas and high-purity $CO_2$. Indonesian low-rank coal and *N. oculata* microalgae biomass with different B/C ratios were used as feed stocks while steam, $CO_2$ and $O_2$ were used as gasifying agents. Aspen Plus software is known in the art and incorporated by reference to https://www.aspentech.com/products/engineering/aspen-plus/ (last accessed Mar. 6, 2019).

This process provides several advantages. The reforming and CO-absorption steps were able to upgrade the syngas quality in term of high concentration of CO and $H_2$, and minimal concentration of $CO_2$, respectively. The increase of pressure diminished the performance of the gasification (CGE, GSE, syngas composition). The increase of B/C ratio has a positive effect on the GSE while an adverse effect on the CGE. The highest GSE (0.99) was exhibited on the gasification of *N. oculata* (B/C ratio=0.00) at 1 bar with the S/C ratio of 0.00, $CO_2$:C molar ratio of unity and $O_2$ equivalence ratio (ER) of 0.36. The highest CGE of 0.49 was observed in the gasification of Indonesian coal at 1 bar with the S/C ratio of 1.00, $CO_2$:C molar ratio of unity and $O_2$ equivalence ratio (ER) of 0.00. The synergetic effect of Indonesian coal and *N. oculata* exhibited an optimum gasification performance. Moreover, the inventors work provided several other surprising advantages including (i) utilizing $CO_2$ as a gasifying agent, (ii) producing superior quality syngas and (iii) providing high purity $CO_2$ for other uses such as methanol synthesis.

Terminology. Terminology used herein is for the purpose of describing particular embodiments only and is not intended to be limiting of the invention.

The headings (such as "Background" and "Summary") and sub-headings used herein are intended only for general organization of topics within the present invention, and are not intended to limit the disclosure of the present invention or any aspect thereof. In particular, subject matter disclosed in the "Background" may include novel technology and may not constitute a recitation of prior art. Subject matter disclosed in the "Summary" is not an exhaustive or complete disclosure of the entire scope of the technology or any embodiments thereof. Classification or discussion of a material within a section of this specification as having a particular utility is made for convenience, and no inference should be drawn that the material must necessarily or solely function in accordance with its classification herein when it is used in any given composition.

As used herein, the singular forms "a", "an" and "the" are intended to include the plural forms as well, unless the context clearly indicates otherwise.

It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

As used herein, the term "and/or" includes any and all combinations of one or more of the associated listed items and may be abbreviated as "/".

Links are disabled by deletion of http: or by insertion of a space or underlined space before www. In some instances, the text or content available via the link on the "last accessed" date may be incorporated by reference.

As used herein in the specification and claims, including as used in the examples and unless otherwise expressly specified, all numbers may be read as if prefaced by the word "substantially", "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), +/−20% of the stated value (or range of values), etc. Any numerical range recited herein is intended to include all sub-ranges subsumed therein.

Disclosure of values and ranges of values for specific parameters (such as temperatures, molecular weights, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10 it also describes subranges for Parameter X including 1-9, 1-8, 1-7, 2-9, 2-8, 2-7, 3-9, 3-8, 3-7, 2-8, 3-7, 4-6, or 7-10, 8-10 or 9-10 as mere examples. A range encompasses its endpoints as well as values inside of an endpoint, for example, the range 0-5 includes 0, >0, 1, 2, 3, 4, <5 and 5.

As used herein, the words "preferred" and "preferably" refer to embodiments of the technology that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the technology.

As referred to herein, all compositional percentages are by weight of the total composition, unless otherwise specified. As used herein, the word "include," and its variants, is intended to be non-limiting, such that recitation of items in a list is not to the exclusion of other like items that may also be useful in the materials, compositions, devices, and methods of this technology. Similarly, the terms "can" and "may" and their variants are intended to be non-limiting, such that recitation that an embodiment can or may comprise certain elements or features does not exclude other embodiments of the present invention that do not contain those elements or features.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Spatially relative terms, such as "under", "below", "lower", "over", "upper", "in front of" or "behind" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

The description and specific examples, while indicating embodiments of the technology, are intended for purposes of illustration only and are not intended to limit the scope of the technology. Moreover, recitation of multiple embodiments having stated features is not intended to exclude other embodiments having additional features, or other embodiments incorporating different combinations of the stated features. Specific examples are provided for illustrative purposes of how to make and use the compositions and methods of this technology and, unless explicitly stated otherwise, are not intended to be a representation that given embodiments of this technology have, or have not, been made or tested.

All publications and patent applications mentioned in this specification are herein incorporated by reference in their entirety to the same extent as if each individual publication or patent application was specifically and individually indicated to be incorporated by reference, especially referenced is disclosure appearing in the same sentence, paragraph, page or section of the specification in which the incorporation by reference appears.

The citation of references herein does not constitute an admission that those references are prior art or have any relevance to the patentability of the technology disclosed herein. Any discussion of the content of references cited is intended merely to provide a general summary of assertions made by the authors of the references, and does not constitute an admission as to the accuracy of the content of such references.

The invention claimed is:

1. A process for producing a syngas, the process comprising:
co-gasifying a feedstock comprising low rank coal and a microalgae biomass, in a biomass:coal ratio in a range of from 0.85 to 0.95, at 1 bar and a temperature in a range of from 700 to 850° C. with a gasification agent comprising at least 90 vol. % oxygen, no more than 5 vol. % nitrogen, steam, and $CO_2$, based on total gasification agent volume, to produce a gasified intermediate;
reforming the gasified intermediate to produce a syngas mixture; and
removing carbon dioxide from the syngas mixture to thereby producing the syngas,
wherein the syngas comprises hydrogen in a range of from 30 to 35 vol. %, carbon monoxide in a range of from 60 to 65 vol. %, and no more than 1 vol. % carbon dioxide,
wherein an $O_2$ equivalence ratio in the feedstock is in a range of from 0.36 to 0.4, and
wherein the biomass:coal ratio, pressure, steam:carbon ratio, $CO_2$:fixed carbon ratio, and $O_2$, equivalence ratio provide a cold gas efficiency in a range of from 0.3 to 0.5.

2. The process of claim 1, wherein the low rank coal is Indonesian coal.

3. The process of claim 1, wherein the microalgae biomass is *Nannochloropsis oculata* microalgae biomass.

4. The process of claim 1, wherein a biomass:coal ratio in the feedstock is in a range of from 0.90 from to 0.95.

5. The process of claim 1, wherein the co-gasifying occurs, based on the total gasification agent volume, in the presence of at least 95 vol. % oxygen.

6. The process of claim 1, wherein the co-gasifying occurs in the presence of water and air.

7. The process of claim 1, wherein the reforming occurs at a pressure in a range of from 1 to 50 bar.

8. The process of claim 1, wherein the co-gasifying and reforming occur at a pressure of 1 bar.

9. The method of claim 1, wherein the biomass:coal ratio, pressure, a steam:carbon ratio, $CO_2$:fixed carbon ratio in the microalgae biomass, and $O_2$ equivalence ratio ratio provide a gasification system efficiency in a range of from 0.8 to 0.99.

10. The method of claim 1, wherein the co-gasifying is performed with a steam:carbon ratio in a range of from 0.9 to 1.1.

11. The method of claim 1, wherein the $O_2$ equivalence ratio is 0.4.

12. The method of claim 1, wherein the $O_2$ equivalence ratio 0.36.

13. The method of claim 1, wherein co-gasifying further comprises removing ash and unconverted char from products of the co-gasifying.

14. The method of claim 1, wherein removing the carbon dioxide from the syngas mixture comprises contacting the syngas mixture with a membrane that separates $CO_2$ from the syngas mixture or by using a chemical adsorbent for $CO_2$.

15. The method of claim 1, wherein the syngas does not contain carbon dioxide.

* * * * *